United States Patent
Devilbiss et al.

(10) Patent No.: US 10,705,929 B2
(45) Date of Patent: *Jul. 7, 2020

(54) SWITCHING SERVERS WITHOUT INTERRUPTING A CLIENT COMMAND-RESPONSE QUEUE

(71) Applicant: International Business Machines Corporation, Armonk, NY (US)

(72) Inventors: Colin R. Devilbiss, Byron, MN (US); Charles S. Graham, Rochester, MN (US); James B. Cunningham, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 2 days.

This patent is subject to a terminal disclaimer.

(21) Appl. No.: 15/854,902

(22) Filed: Dec. 27, 2017

(65) Prior Publication Data

US 2019/0034300 A1 Jan. 31, 2019

Related U.S. Application Data

(63) Continuation of application No. 15/664,001, filed on Jul. 31, 2017.

(51) Int. Cl.
*G06F 11/00* (2006.01)
*G06F 11/20* (2006.01)
*G06F 11/14* (2006.01)

(52) U.S. Cl.
CPC ...... *G06F 11/2033* (2013.01); *G06F 11/1484* (2013.01); *G06F 2201/805* (2013.01)

(58) Field of Classification Search
CPC ............... G06F 3/0659; G06F 11/2033; G06F 11/2092; G06F 11/1423; G06F 11/20;

(Continued)

(56) References Cited

U.S. PATENT DOCUMENTS 6,963,932 B2 11/2005 Bhat
7,013,305 B2 * 3/2006 Elko .................. G06F 11/2007
707/687

(Continued)

OTHER PUBLICATIONS

Benoit, "Unleash the true potential of SRIOV vNIC using vNIC failover!" Posted Dec. 3, 2016, 10 pages http://chmod666.org/index.php/unleash-the-true-potential-of-sriov-vnic-using-vnic-failover/.

(Continued)

*Primary Examiner* — Loan L. T. Truong
(74) *Attorney, Agent, or Firm* — Jared C. Chaney

(57) ABSTRACT

The present invention provides computer implemented method, system, and computer program product of switching servers without interrupting a client command-response queue. In an embodiment, the present invention includes selecting standby computer server systems, connecting a CRQ of a client computer system to a previous active computer server system and to the selected standby computer server systems, transmitting setup commands to the selected standby computer server systems, communicating data with the previous active computer server system via at least one sub-CRQ, communicating management commands with the previous active computer server system and the selected standby computer server systems via the CRQ, receiving a notification that a switchover has occurred, redirecting the CRQ to one of the selected standby computer server systems, in response to the redirecting, communicating data with a new active computer server system via at least one sub-CRQ, and sending new setup commands to the new computer server system.

20 Claims, 10 Drawing Sheets

(58) Field of Classification Search
CPC .. G06F 11/2028; G06F 11/2097; G06F 13/00; H04L 67/42; H04L 69/40; H04L 45/22; H04L 45/70; H04L 67/2842; H02H 3/05
See application file for complete search history.

(56) References Cited

U.S. PATENT DOCUMENTS

| | | | | |
|---|---|---|---|---|
| 7,093,013 | B1* | 8/2006 | Hornok, Jr. | G06F 11/2028 370/241.1 |
| 7,467,191 | B1* | 12/2008 | Wang | G06F 11/2092 709/221 |
| 8,561,065 | B2 | 10/2013 | Cunningham et al. | |
| 8,607,091 | B2* | 12/2013 | Asbun | H04L 69/40 714/4.1 |
| 8,645,755 | B2 | 2/2014 | Brownlow et al. | |
| 8,788,873 | B2* | 7/2014 | Galles | G06F 13/4022 707/648 |
| 9,473,400 | B1* | 10/2016 | DeVilbiss | H04L 45/70 |
| 9,507,674 | B2* | 11/2016 | McCarthy | G06F 11/1441 |
| 9,852,034 | B2* | 12/2017 | Akirav | G06F 11/2007 |
| 2002/0188904 | A1* | 12/2002 | Chen | G01R 31/31834 714/741 |
| 2003/0126347 | A1* | 7/2003 | Tan | G06F 3/0607 710/313 |
| 2006/0085273 | A1* | 4/2006 | Mayer | G06Q 30/0635 705/26.81 |
| 2008/0046971 | A1* | 2/2008 | Swander | H04L 63/1408 726/3 |
| 2008/0126753 | A1* | 5/2008 | Chao | G06F 9/3802 712/34 |
| 2008/0228927 | A1* | 9/2008 | Toub | H04L 67/02 709/228 |
| 2009/0234908 | A1* | 9/2009 | Reyhner | G06F 9/546 709/203 |
| 2009/0310483 | A1 | 12/2009 | Okazaki | |
| 2010/0229040 | A1* | 9/2010 | Chen | G06F 16/3331 714/27 |
| 2013/0031164 | A1* | 1/2013 | Sundaram | H02H 7/261 709/203 |
| 2015/0178243 | A1* | 6/2015 | Lowery | G06F 3/0619 709/212 |
| 2015/0234601 | A1* | 8/2015 | Tsai | G06F 3/0611 711/103 |
| 2017/0109290 | A1* | 4/2017 | Albot | G06F 12/1009 |
| 2018/0157496 | A1* | 6/2018 | Eide | G06F 9/445 |
| 2018/0159963 | A1* | 6/2018 | Chen | G06F 1/16 |

OTHER PUBLICATIONS

Devilbiss et al., Switching Servers Without Interrupting a Client Command-Response Queue, U.S. Appl. No. 15/664,001, filed Jul. 31, 2017.
List of IBM Patents or Patent Applications Treated as Related, Dated Dec. 26, 2017, 2 pages.

* cited by examiner

SWITCHING SERVERS WITHOUT INTERRUPTING A CLIENT COMMAND-RESPONSE QUEUE

BACKGROUND

The present disclosure relates to computer systems, and more specifically, to switching servers without interrupting a client command-response queue.

SUMMARY

The present invention provides a computer implemented method, a system, and a computer program product of switching servers without interrupting a client command-response queue. In an exemplary embodiment, the computer implemented method, the system, and the computer program product include (1) selecting, by a client computer system, standby computer server systems logically coupled to the client computer system, where the selected standby computer server systems are compatible with the client computer system and where the client computer system is logically coupled to a command-response queue (CRQ), (2) in response to determining by the client computer system that at least one of the selected standby computer server systems is ready, connecting, by the client computer system, the CRQ to a previous active computer server system and to the selected standby computer server systems, (3) in response to the connecting, transmitting setup commands to the selected standby computer server systems, resulting in the selected standby computer server systems having the same logical state as the previous active computer server system, (4) communicating, by the client computer system, data with the previous active computer server system via at least one sub-CRQ logically coupling the client computer system and the previous active computer server system, (5) in response to the transmitting, communicating, by the client computer system, management commands with the previous active computer server system and the selected standby computer server systems via the CRQ, (6) receiving, by the client computer system, a notification that a switchover has occurred among the previous active computer server system and the selected standby computer server systems, (7) in response to receiving by the client computer system the notification, redirecting the CRQ to one of the selected standby computer server systems, resulting in the one of the selected standby computer server systems being designated as a new active computer server system, (8) in response to the redirecting, communicating, by the client computer system, data with the new active computer server system via at least one sub-CRQ logically coupling the client computer system and the new active computer server system, and (9) in response to receiving by the client computer system a request from a new computer server system to become a new standby computer server system, sending new setup commands to the new computer server system, resulting in the new computer server system having the same logical state as an active computer server system and being designated as the new standby computer server system. In an embodiment, the client computer system includes a client partition of a computer system, where the client partition includes a vNIC client.

DETAILED DESCRIPTION

Figure 1A:
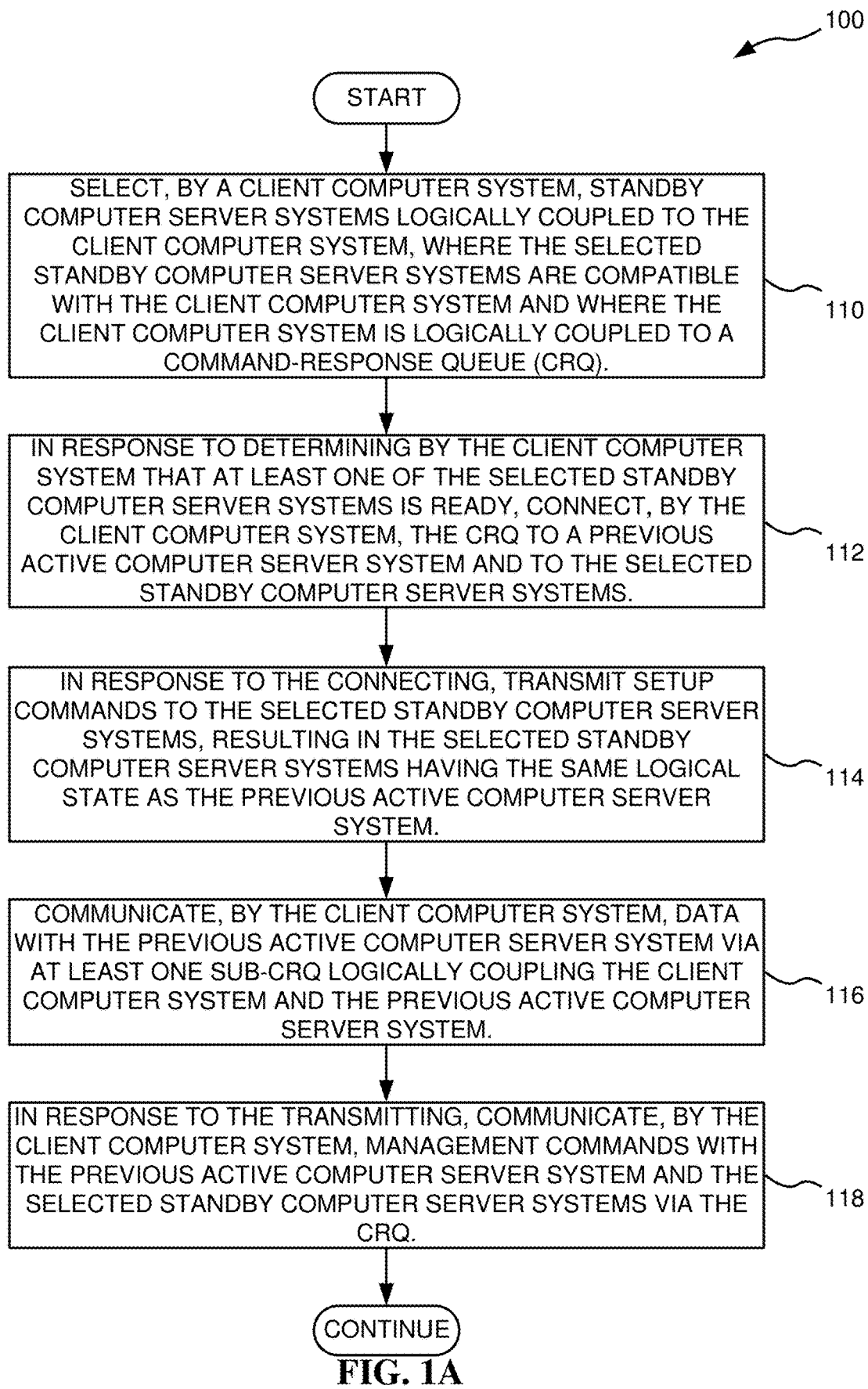
FIG. 1A depicts a flowchart in accordance with an exemplary embodiment of the present invention.

The present invention provides a computer implemented method, a system, and a computer program product of switching servers without interrupting a client command-response queue. In an exemplary embodiment, the computer implemented method, the system, and the computer program product include (1) selecting, by a client computer system, standby computer server systems logically coupled to the client computer system, where the selected standby computer server systems are compatible with the client computer system and where the client computer system is logically coupled to a command-response queue (CRQ), (2) in response to determining by the client computer system that at least one of the selected standby computer server systems is ready, connecting, by the client computer system, the CRQ to a previous active computer server system and to the selected standby computer server systems, (3) in response to the connecting, transmitting setup commands to the selected standby computer server systems, resulting in the selected standby computer server systems having the same logical state as the previous active computer server system, (4) communicating, by the client computer system, data with the previous active computer server system via at least one sub-CRQ logically coupling the client computer system and the previous active computer server system, (5) in response to the transmitting, communicating, by the client computer system, management commands with the previous active computer server system and the selected standby computer server systems via the CRQ, (6) receiving, by the client computer system, a notification that a switchover has occurred among the previous active computer server system and the selected standby computer server systems, (7) in response to receiving by the client computer system the notification, redirecting the CRQ to one of the selected standby computer server systems, resulting in the one of the selected standby computer server systems being designated as a new active computer server system, (8) in response to the redirecting, communicating, by the client computer system, data with the new active computer server system via at least one sub-CRQ logically coupling the client computer system and the new active computer server system, and (9) in response to receiving by the client computer system a request from a new computer server system to become a new standby computer server system, sending new setup commands to the new computer server system, resulting in the new computer server system having the same logical state as an active computer server system and being designated as the new standby computer server system. In an embodiment, the client computer system includes a client partition of a computer system, where the client partition includes a vNIC client. In a particular embodiment, the client computer system is a client partition of a computer system, where the client partition includes a vNIC client. In a specific embodiment, the client partition includes data buffers. In an embodiment, the standby computer server systems include virtual input/output (I/O) servers, where each of the virtual I/O servers include a vNIC server and a logical port. In a particular embodiment, the standby computer server systems are virtual input/output (I/O) servers, where each of the virtual I/O servers include a vNIC server and a logical port. In an embodiment, the previous active computer server system includes a virtual input/output (I/O) server, where the virtual I/O server includes a vNIC server and a logical port. In a particular embodiment, the previous active computer server system is a virtual input/output (I/O) server, where the virtual I/O server includes a vNIC server and a logical port. In an embodiment, the active computer server system is the previous active computer server system. In an embodiment, the active computer server system is the new active computer server system. In an embodiment, the CRQ is a logical communication connection between the client computer system and the standby computer server systems.

Definitions

Network Interface Controller (NIC)

A network interface controller (NIC) (i.e., a network interface card, a network adapter, a local area network (LAN) adapter, a physical network interface) is a computer hardware component that connects a computer to a computer network. Current network interface controllers offer advanced features such as interrupt and direct memory access (DMA) interfaces to the host processors, support for multiple receive and transmit queues, partitioning into multiple logical interfaces, and on-controller network traffic processing. A NIC implements the electronic circuitry required to communicate using a specific physical layer and data link layer standard (e.g., Ethernet), providing a base for a full network protocol stack, thereby allowing communication among small groups of computers on the same LAN and large-scale network communications through routable protocols, such as Internet Protocol (IP). A NIC is both a physical layer and data link layer device, as it provides physical access to a networking medium and, could provide a low-level addressing system through the use of media access control (MAC) addresses that are uniquely assigned to network interfaces.

Logical Partition

A logical partition (LPAR) is a subset of a computer's hardware resources, virtualized as a separate computer. In effect, a physical computer system could be partitioned into multiple logical partitions, each hosting a separate operating system. Logical partitioning divides hardware resources such that two LPARs could access memory from a common memory chip, provided that the ranges of addresses directly accessible to each do not overlap, where one partition could indirectly control memory controlled by a second partition, but only by commanding a process in that partition. Also, central processing units (CPUs) may be dedicated to a single LPAR or shared.

Virtual Machine (VM)

A virtual machine (VM) is an emulation of a computer system where VMs are based on computer architectures and provide functionality of a physical computer. System VMs (i.e., full virtualization VMs) provide a substitute for a real machine such that they provide functionality needed to execute entire operating systems. For example, a hypervisor uses native execution to share and manage hardware, allowing for multiple environments which are isolated from one another, yet exist on the same physical machine, and modern hypervisors use hardware-assisted virtualization, virtualization-specific hardware, primarily from the host CPUs. Process VMs are designed to execute computer programs in a platform-independent environment. Some VMs are designed to also emulate different architectures and allow execution of software applications and operating systems written for another CPU or architecture.

Hypervisor

A hypervisor (i.e., virtual machine monitor (VMM)) is computer software, firmware or hardware that creates and runs virtual machines such that a computer on which a hypervisor runs one or more virtual machines is called a host machine, and each virtual machine is called a guest machine. The hypervisor presents the guest operating systems with a virtual operating platform and manages the execution of the guest operating systems where multiple instances of a variety of operating systems could share the virtualized hardware resources.

Virtual Network Interface Controller (vNIC)

A virtual network interface controller (vNIC) is a virtual networking technology/protocol and a client-server protocol that virtualizes access to a single Ethernet device. A "dedicated VNIC" describes a configuration in which a vNIC server is connected to a single vNIC client via a command-response queue (CRQ), allowing minimal overhead when communicating between the client and the Ethernet device. However, individual Ethernet links are inherently exposed to failures, thereby leading to the need for some form of redundancy to ensure that network connectivity is maintained in the face of such a failure. Current vNIC configurations provide server-side redundancy. The vNIC protocol is divided into commands (which use the "main CRQ") and transmit/receive traffic (using the "sub-CRQs"). The vNIC protocol also has a mechanism for communicating a "logical link down" notification, which could force the client to recognize that all pending traffic (outgoing frames as well as buffers that are ready to accept incoming frames) would be considered lost. Also, computer software firmware would be a conduit for CRQ commands, vNIC could provide bandwidth control Quality of Service (QoS) capabilities at the virtual NIC level. vNIC could reduce virtualization overhead resulting in lower latencies and less server resources (CPU, memory) required for network virtualization. The client partition's vNIC adapter control flow interface to a virtual input/output (I/O) server (VIOS) is a virtualized interface to hide characteristics of the physical I/O adapter from the client vNIC adapter. Virtualizing the vNIC adapter interface allows the client partition to be a candidate for live partition mobility (LPM). To provide an efficient and managed transfer of data between partition memory and the I/O adapter, each client vNIC adapter is associated with a VIOS a single root input/output (I/O) virtualization and sharing (SR-IOV) logical port in a one-to-one relationship such that the SR-IOV adapter hardware manages the routing of data between the adapter and partitions without additional overhead of a hypervisor or VIOS. Such a configuration could allow for bandwidth control QoS characteristics for the client vNIC adapter by mapping each client vNIC adapter to its own adapter virtual function (VF).

With a vNIC, a one-to-one mapping or connection between a vNIC adapter in a client logical partition (LPAR)

and a backing logical port in the VIOS exists, such that packet data for transmission (similarly for receive) can be moved from the client LPAR memory to a single root input/output (I/O) virtualization and sharing (SR-IOV) adapter directly without being copied to the VIOS memory. A vNIC device could support multiple transmit and receive queues, like many high performance NIC adapters. In addition, a QoS feature of the vNIC could ensure that each logical port receives its share of adapter resources, which includes its share of the physical port bandwidth. vNIC supports link aggregation technologies and active-back approaches for failover with some limitations. In the case of link aggregation technologies, the backing logical port may be required to be the only VF on the physical port. When using an active-backup approach, a capability to detect a failover condition may be required to be configured, such as an IP address.

vNIC support could be added to a partition by adding a vNIC client virtual adapter to the partition using a hardware management console (HMC) for a computer system. When adding a vNIC client, a user could select the backing SR-IOV adapter, the physical port, and the VIOS hosting the server devices, could define capacity, and other parameters (e.g., Port VLAN ID, VLAN access list), with default settings being used if the user did not specify parameters. HMC creates all the necessary devices in the client LPAR as well as VIOS and supports configuration and control of vNIC configurations in the graphical user interface (GUI), command line, or an application programming interface (API) (e.g., REST API).

During LPM or remote restart operations, the HMC could handle the creation of the vNIC server and backing devices on the target system and cleanup of devices on the source system when LPM completes. The HMC could also provide auto-mapping of devices (namely selecting suitable VIOS and SR-IOV adapter port to back each vNIC device), where the SR-IOV port label, available capacity, and VIOS redundancy are some of the items used by the HMC for auto mapping. Optionally, users could also have the choice of specifying their own mapping manually.

Need to Switch Servers without Interrupting a Client Command-Response Queue

Existing server-side failover vNIC designs require resetting the client's CRQ communication with the server and establishing a CRQ connection to the new server. Establishing the new connection is not instantaneous, and can result in some disruption to the client network stack and delay recovery.

Figure 1B:
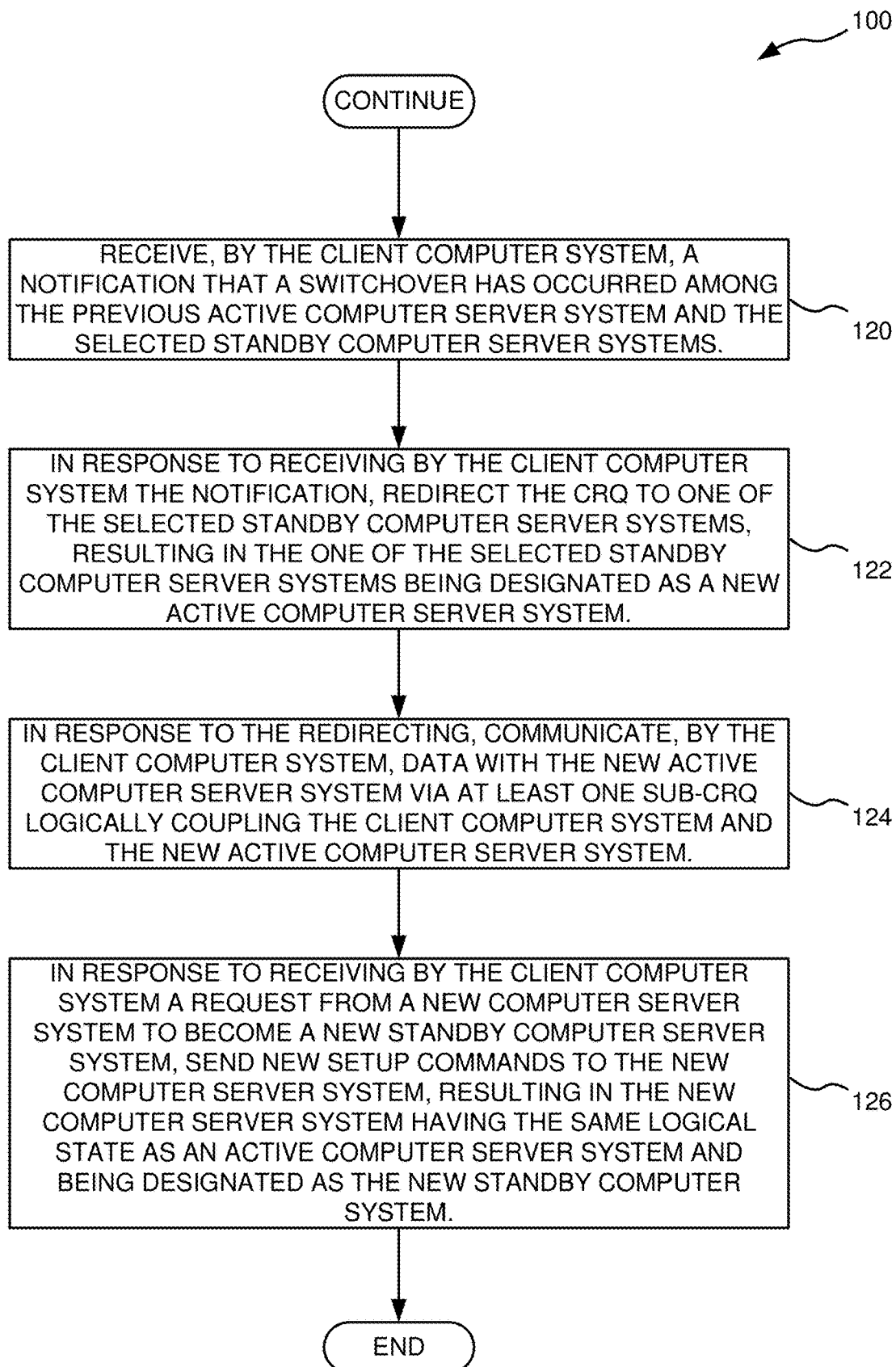
FIG. 1B depicts a flowchart in accordance with an exemplary embodiment of the present invention.

Referring to FIG. 1A and FIG. 1B, in an exemplary embodiment, the present invention is configured to perform an operation 110 of selecting, by a client computer system, standby computer server systems logically coupled to the client computer system, where the selected standby computer server systems are compatible with the client computer system and where the client computer system is logically coupled to a command-response queue (CRQ), an operation 112 of in response to determining by the client computer system that at least one of the selected standby computer server systems is ready, connecting, by the client computer system, the CRQ to a previous active computer server system and to the selected standby computer server systems, an operation 114 of in response to the connecting, transmitting setup commands to the selected standby computer server systems, resulting in the selected standby computer server systems having the same logical state as the previous active computer server system, an operation 116 of communicating, by the client computer system, data with the previous active computer server system via at least one sub-CRQ logically coupling the client computer system and the previous active computer server system, an operation 118 of in response to the transmitting, communicating, by the client computer system, management commands with the previous active computer server system and the selected standby computer server systems via the CRQ, an operation 120 of receiving, by the client computer system, a notification that a switchover has occurred among the previous active computer server system and the selected standby computer server systems, an operation 122 of in response to receiving by the client computer system the notification, redirecting the CRQ to one of the selected standby computer server systems, resulting in the one of the selected standby computer server systems being designated as a new active computer server system, an operation 124 of in response to the redirecting, communicating, by the client computer system, data with the newt active computer server system via at least one sub-CRQ logically coupling the client computer system and the new active computer server system, and an operation 126 of in response to receiving by the client computer system a request from a new computer server system to become a new standby computer server system, sending new setup commands to the new computer server system, resulting in the new computer server system having the same logical state as an active computer server system and being designated as the new standby computer server system.

In an embodiment, the present invention provides a way of concurrently maintaining the operational characteristics of multiple "concrete" links to be compatible with the operational characteristics of the "virtual" link, thus allowing switchover between concrete links without needing to restore those characteristics during the switchover event. In an embodiment, multiple "matching" servers (i.e., standby computer server systems) are attached to the same client (i.e., a client computer system), and the client negotiates the initial setup with the multiple matching servers (with some assistance from firmware). In a specific embodiment, after the initial setup, one of the "matching servers" is chosen as the active server, and all client frames run through that active server. In a further embodiment, if the active server were interrupted, the client is notified and can immediately resume sending and receiving traffic on the other server (which has already completed initial setup). For example, the client may not need to notify its networking stack that anything has occurred if the active server were interrupted, thereby possibly minimizing/eliminating downtime of a computer system using/including the "matching" servers and the client. In an embodiment, traffic goes to a single server at a time, but all of the other commands (e.g., "setup", multicast subscription management) describe state that must be initialized on any server that needs to be prepared to take over traffic. For example, the main CRQ could be the natural mechanism for "multiplexing" the client-servers connection.

Figure 6:
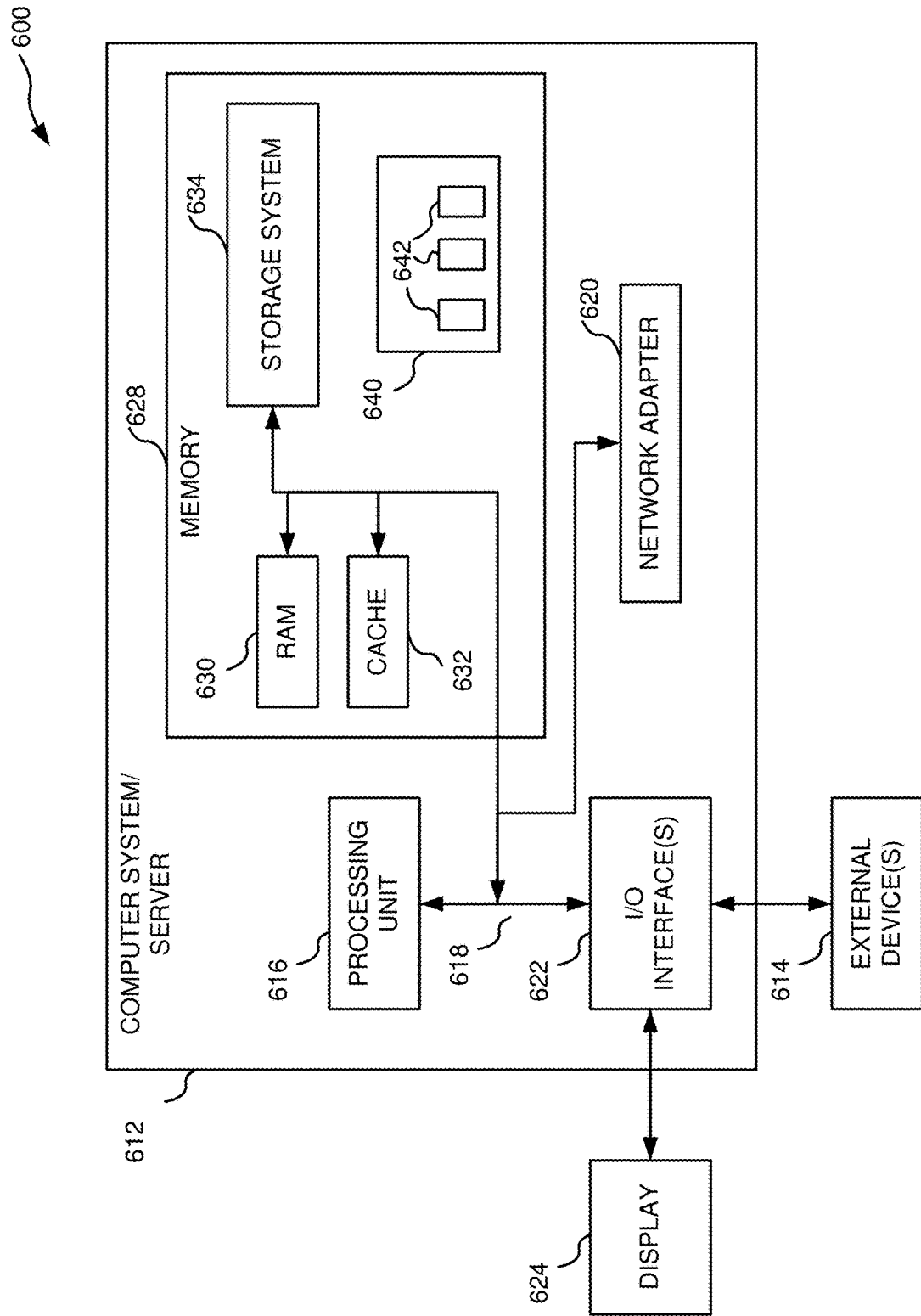
FIG. 6 depicts a computer system in accordance with an exemplary embodiment of the present invention.

In an embodiment, the client computer system is a computer system 600 as shown in FIG. 6, that executes a switching servers script or computer software application that carries out the operations of at least method 100. In an embodiment, the client computer system is a computer system/server 612 as shown in FIG. 6, that executes a switching servers script or computer software application that carries out the operations of at least method 100. In an embodiment, the client computer system is a processing unit 616 as shown in FIG. 6, that executes a switching servers script or computer software application that carries out the operations of at least method 100. In an embodiment, the client computer system is a vNIC client device that executes a switching servers script or computer software application that carries out the operations of at least method 100. In an embodiment, the client computer system is a computer system 600 as shown in FIG. 6, that executes a switching servers script or computer software application that carries out at least operations 110, 112, 116, 118, 120, and 124. In an embodiment, the client computer system is a computer system/server 612 as shown in FIG. 6, that executes a switching servers script or computer software application that carries out at least operations 110, 112, 116, 118, 120, and 124. In an embodiment, the client computer system is a processing unit 616 as shown in FIG. 6, that executes a switching servers script or computer software application that carries out at least operations 110, 112, 116, 118, 120, and 124, and 180. In an embodiment, the client computer system is a vNIC client device that executes a switching servers script or computer software application that carries out at least operations 110, 112, 116, 118, 120, and 124.

Figure 1C:
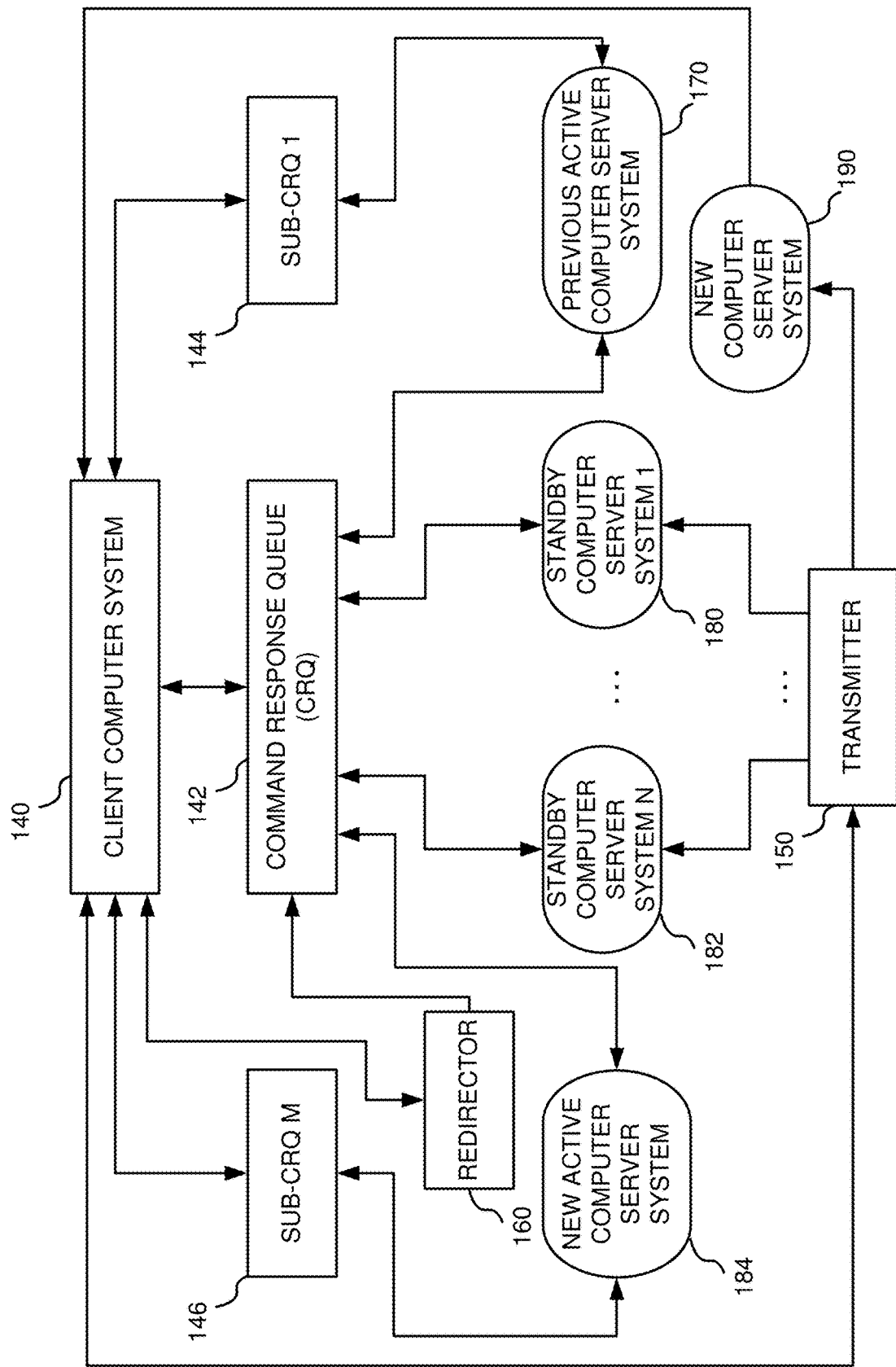
FIG. 1C depicts a block diagram in accordance with an exemplary embodiment of the present invention.

Referring to FIG. 1C, in an exemplary embodiment, the present invention includes a client computer system 140, a command-response queue (CRQ) 142, at least two sub-CRQs 144, 146 (e.g., sub-CRQ 1, sub-CRQ M), a transmitter 150, and a redirector 160. In an embodiment, client computer system 140 is configured to select standby computer server systems 180, 182 (e.g., standby computer server system 1, standby computer server system N) logically coupled to client computer system 140, where selected standby computer server systems 180, 182 are compatible with client computer system 140 and where client computer system 140 is logically coupled to a command-response queue (CRQ) 142. In an embodiment, client computer system 140 includes a computer system, such as computer system 600 as shown in FIG. 6, performing operation 110. In an embodiment, client computer system 140 includes a computer system, such as computer system/server 612 as shown in FIG. 6, performing operation 110. In an embodiment, client computer system 140 includes a computer system, such as processing unit 616 as shown in FIG. 6, performing operation 110. In an embodiment, client computer system 140 is a vNIC client device performing operation 110. In an embodiment, client computer system 140 is implemented as computer software executing on a computer system, such as computer system 600 as shown in FIG. 6, such that the computer system performs operation 110. In an embodiment, client computer system 140 is implemented as computer software executing on a computer system, such as computer system/server 612 as shown in FIG. 6, such that the computer system performs operation 110. In an embodiment, client computer system 140 is implemented as computer software executing on a computer system, such as processing unit 616 as shown in FIG. 6 such that the computer system performs operation 110. In an embodiment, client computer system 140 is implemented as computer software executing on a computer system, such as a vNIC client device, such that the computer system performs operation 110. In a particular embodiment, client computer system 140 is configured to select standby computer server systems 180, 182 via CRQ 142. For example, a user could select multiple server "backing devices" (i.e., standby computer server systems 180, 182), all of which would have to be "compatible", where there are several capabilities exchanges between the client and the active server and where any "hot backup" servers (e.g., selected standby computer server systems 180, 182) would have to be prepared to handle the same capabilities advertised by the active server.

In an embodiment, client computer system 140 is configured to connect, in response to determining by client computer system 140 that at least one of selected standby computer server systems 180, 182 is ready, CRQ 142 to a previous active computer server system 170 and to selected standby computer server systems 180, 182. In an embodiment, client computer system 140 includes a computer system, such as computer system 600 as shown in FIG. 6, performing operation 112. In an embodiment, client computer system 140 includes a computer system, such as computer system/server 612 as shown in FIG. 6, performing operation 112. In an embodiment, client computer system 140 includes a computer system, such as processing unit 616 as shown in FIG. 6, performing operation 112. In an embodiment, client computer system 140 is a vNIC client device performing operation 112. In an embodiment, client computer system 140 is implemented as computer software executing on a computer system, such as computer system 600 as shown in FIG. 6, such that the computer system performs operation 112. In an embodiment, client computer system 140 is implemented as computer software executing on a computer system, such as computer system/server 612 as shown in FIG. 6, such that the computer system performs operation 112. In an embodiment, client computer system 140 is implemented as computer software executing on a computer system, such as processing unit 616 as shown in FIG. 6 such that the computer system performs operation 112. In an embodiment, client computer system 140 is implemented as computer software executing on a computer system, such as a vNIC client device, such that the computer system performs operation 112. For example, once configuration is complete and at least one server is active, the client could connect its main CRQ and begin setup.

In an embodiment, transmitter 150 is configured to transmit, in response to the connecting, setup commands to selected standby computer server systems 180, 182, resulting in selected standby computer server systems 180, 182 having the same logical state as previous active computer server system 170. In an embodiment, transmitter 150 includes a computer system, such as computer system 600 as shown in FIG. 6, performing operation 114. In an embodiment, transmitter 150 includes a computer system, such as computer system/server 612 as shown in FIG. 6, performing operation 114. In an embodiment, transmitter 150 includes a computer system, such as processing unit 616 as shown in FIG. 6, performing operation 114. In an embodiment, transmitter 150 is implemented as computer software executing on a computer system, such as computer system 600 as shown in FIG. 6, such that the computer system performs operation 114. In an embodiment, transmitter 150 is implemented as computer software executing on a computer system, such as computer system/server 612 as shown in FIG. 6, such that the computer system performs operation 114. In an embodiment, transmitter 150 is implemented as computer software executing on a computer system, such as processing unit 616 as shown in FIG. 6 such that the computer system performs operation 114. In a particular embodiment, transmitter 150 is client computer system 140. In a particular embodiment, transmitter 150 is computer software firmware. For example, all of the setup commands could be sent to the full set of compatible backup servers (i.e., selected computer server systems 180, 182) so that their state is (nearly) identical with the active server (e.g., previous active computer system 170), such that if any backup server were to give an incompatible response for any key/setup command, that backup server would have to be removed from a "hot backup" set.

In an embodiment, client computer system 140 is configured to communicate data with previous active computer server system 170 via at least one sub-CRQ 144 (e.g., sub-CRQ 1) logically coupling client computer system 140 and active computer server system 170. In an embodiment, client computer system 140 includes a computer system, such as computer system 600 as shown in FIG. 6, performing operation 116. In an embodiment, client computer system 140 includes a computer system, such as computer system/server 612 as shown in FIG. 6, performing operation 116. In an embodiment, client computer system 140 includes a computer system, such as processing unit 616 as shown in FIG. 6, performing operation 116. In an embodiment, client computer system 140 is a vNIC client device performing operation 116. In an embodiment, client computer system 140 is implemented as computer software executing on a computer system, such as computer system 600 as shown in FIG. 6, such that the computer system performs operation 116. In an embodiment, client computer system 140 is implemented as computer software executing on a computer system, such as computer system/server 612 as shown in FIG. 6, such that the computer system performs operation 116. In an embodiment, client computer system 140 is implemented as computer software executing on a computer system, such as processing unit 616 as shown in FIG. 6 such that the computer system performs operation 116. In an embodiment, client computer system 140 is implemented as computer software executing on a computer system, such as a vNIC client device, such that the computer system performs operation 116. For example, once initial setup is complete, the client (e.g., client computer system 140) could begin sending and receiving traffic through the sub-CRQs assigned to the active connection.

In an embodiment, client computer system 140 is configured to communicate, in response to the transmitting, management commands with previous active computer server system 170 and selected standby computer server systems 180, 182 via CRQ 142. In an embodiment, client computer system 140 includes a computer system, such as computer system 600 as shown in FIG. 6, performing operation 118. In an embodiment, client computer system 140 includes a computer system, such as computer system/server 612 as shown in FIG. 6, performing operation 118. In an embodiment, client computer system 140 includes a computer system, such as processing unit 616 as shown in FIG. 6, performing operation 118. In an embodiment, client computer system 140 is a vNIC client device performing operation 118. In an embodiment, client computer system 140 is implemented as computer software executing on a computer system, such as computer system 600 as shown in FIG. 6, such that the computer system performs operation 118. In an embodiment, client computer system 140 is implemented as computer software executing on a computer system, such as computer system/server 612 as shown in FIG. 6, such that the computer system performs operation 118. In an embodiment, client computer system 140 is implemented as computer software executing on a computer system, such as processing unit 616 as shown in FIG. 6 such that the computer system performs operation 118. In an embodiment, client computer system 140 is implemented as computer software executing on a computer system, such as a vNIC client device, such that the computer system performs operation 118. For example, additional "management" commands (like multicast subscription changes) could continue to flow through the main CRQ.

In an embodiment, client computer system 140 is configured to receive a notification that a switchover has occurred among previous active computer server system 170 and selected standby computer server systems 180, 182. In an embodiment, client computer system 140 includes a computer system, such as computer system 600 as shown in FIG. 6, performing operation 120. In an embodiment, client computer system 140 includes a computer system, such as computer system/server 612 as shown in FIG. 6, performing operation 120. In an embodiment, client computer system 140 includes a computer system, such as processing unit 616 as shown in FIG. 6, performing operation 120. In an embodiment, client computer system 140 is a vNIC client device performing operation 120. In an embodiment, client computer system 140 is implemented as computer software executing on a computer system, such as computer system 600 as shown in FIG. 6, such that the computer system performs operation 120. In an embodiment, client computer system 140 is implemented as computer software executing on a computer system, such as computer system/server 612 as shown in FIG. 6, such that the computer system performs operation 120. In an embodiment, client computer system 140 is implemented as computer software executing on a computer system, such as processing unit 616 as shown in FIG. 6 such that the computer system performs operation 120. In an embodiment, client computer system 140 is implemented as computer software executing on a computer system, such as a vNIC client device, such that the computer system performs operation 120. For example, when a switchover occurs (either because of failure of the active server or because of a directed choice by the user or by firmware), the client (e.g., client computer system 140) would have to be made aware by some form of notification, probably on its main CRQ (e.g., CRQ 142).

In an embodiment, redirector 160 is configured to redirect, in response to receiving by the client computer system the notification, CRQ 142 to one of selected standby computer server systems 180, 182, resulting in the one of selected standby computer server systems 180, 182 being designated as a new active computer server system 184. In an embodiment, redirector 160 includes a computer system, such as computer system 600 as shown in FIG. 6, performing operation 122. In an embodiment, redirector 160 includes a computer system, such as computer system/server 612 as shown in FIG. 6, performing operation 122. In an embodiment, redirector 160 includes a computer system, such as processing unit 616 as shown in FIG. 6, performing operation 122. In an embodiment, redirector 160 is implemented as computer software executing on a computer system, such as computer system 600 as shown in FIG. 6, such that the computer system performs operation 122. In an embodiment, redirector 160 is implemented as computer software executing on a computer system, such as computer system/server 612 as shown in FIG. 6, such that the computer system performs operation 122. In an embodiment redirector 160 is implemented as computer software executing on a computer system, such as processing unit 616 as shown in FIG. 6 such that the computer system performs operation 122. In a particular embodiment, redirector 160 is client computer system 140. In a particular embodiment, redirector 160 is computer software firmware. For example, the main CRQ would have to be redirected to one of the "hot backup" servers (which would already be in the correct state to begin sending and receiving traffic as the client has directed), such that client (e.g., client computer system 140) could resume traffic immediately by sending buffers down to accept incoming traffic and by sending outgoing frames through the sub-CRQs associated with the new server.

In an embodiment, client computer system 140 is configured to communicate, in response to the redirecting, data with new active computer server system 184 via at least one sub-CRQ 146 logically coupling client computer system 140 and new active computer server system 184. In an embodiment, client computer system 140 includes a computer system, such as computer system 600 as shown in FIG. 6, performing operation 124. In an embodiment, client computer system 140 includes a computer system, such as computer system/server 612 as shown in FIG. 6, performing operation 124. In an embodiment, client computer system 140 includes a computer system, such as processing unit 616 as shown in FIG. 6, performing operation 124. In an embodiment, client computer system 140 is a vNIC client device performing operation 124. In an embodiment, client computer system 140 is implemented as computer software executing on a computer system, such as computer system 600 as shown in FIG. 6, such that the computer system performs operation 124. In an embodiment, client computer system 140 is implemented as computer software executing on a computer system, such as computer system/server 612 as shown in FIG. 6, such that the computer system performs operation 124. In an embodiment, client computer system 140 is implemented as computer software executing on a computer system, such as processing unit 616 as shown in FIG. 6 such that the computer system performs operation 124. In an embodiment, client computer system 140 is implemented as computer software executing on a computer system, such as a vNIC client device, such that the computer system performs operation 124.

In an embodiment, transmitter 150 is configured to send, in response to receiving by client computer system 140 a request from a new computer server system 190 to become a new standby computer server system, new setup commands to new computer server system 190, resulting in new computer server system 190 having the same logical state as a new active computer server system and being designated as the new standby computer server system. In an embodiment, transmitter 150 includes a computer system, such as computer system 600 as shown in FIG. 6, performing operation 126. In an embodiment, transmitter 150 includes a computer system, such as computer system/server 612 as shown in FIG. 6, performing operation 126. In an embodiment, transmitter 150 includes a computer system, such as processing unit 616 as shown in FIG. 6, performing operation 126. In an embodiment, transmitter 150 is implemented as computer software executing on a computer system, such as computer system 600 as shown in FIG. 6, such that the computer system performs operation 126. In an embodiment, transmitter 150 is implemented as computer software executing on a computer system, such as computer system/server 612 as shown in FIG. 6, such that the computer system performs operation 126. In an embodiment, transmitter 150 is implemented as computer software executing on a computer system, such as processing unit 616 as shown in FIG. 6 such that the computer system performs operation 126. In a particular embodiment, transmitter 150 is client computer system 140. In a particular embodiment, transmitter 150 is computer software firmware. In a particular embodiment, the active computer server system is previous active computer server system 170. In a particular embodiment, the active computer server system is new active computer server system 184. For example, if a previously-inactive server were to attempt to join the "hot backup" set (e.g., a previously failed-while-active server, or a dynamically-added backing device), the current state would have to be mirrored to the new server and responses from the new server would have to conform to those given by the active server (e.g., previous active computer server system 170, new active computer server system 184).

Receiving Notification of Switchover

In an exemplary embodiment, the receiving the notification that the switchover has occurred includes receiving, by the client computer system, the notification via the CRQ. In an embodiment, receiving operation 120 includes receiving, by the client computer system, the notification via the CRQ. In an embodiment, client computer system 140 is configured to receive the notification via CRQ 142. In an embodiment, client computer system 140 includes a computer system, such as computer system 600 as shown in FIG. 6, receiving the notification via CRQ 142. In an embodiment, client computer system 140 includes a computer system, such as computer system/server 612 as shown in FIG. 6, receiving the notification via CRQ 142. In an embodiment, client computer system 140 includes a computer system, such as processing unit 616 as shown in FIG. 6, receiving the notification via CRQ 142. In an embodiment, client computer system 140 is a vNIC client device receiving the notification via CRQ 142.

In an embodiment, client computer system 140 is implemented as computer software executing on a computer system, such as computer system 600 as shown in FIG. 6, such that the computer system receives the notification via CRQ 142. In an embodiment, client computer system 140 is implemented as computer software executing on a computer system, such as computer system/server 612 as shown in FIG. 6, such that the computer system receives the notification via CRQ 142. In an embodiment, client computer system 140 is implemented as computer software executing on a computer system, such as processing unit 616 as shown in FIG. 6, such that the computer system receives the notification via CRQ 142. In an embodiment, client computer system 140 is implemented as computer software executing on a computer system, such as a vNIC client device, such that the computer system receives the notification via CRQ 142. In an embodiment, client computer system 140 receives the notification via CRQ 142 as computer software executing on a processor of client computer system 140. In an embodiment, client computer system 140 receives the notification via CRQ 142 as computer software executing on a vNIC client device.

Transmitting Setup Commands via Client Computer System

Figure 2A:
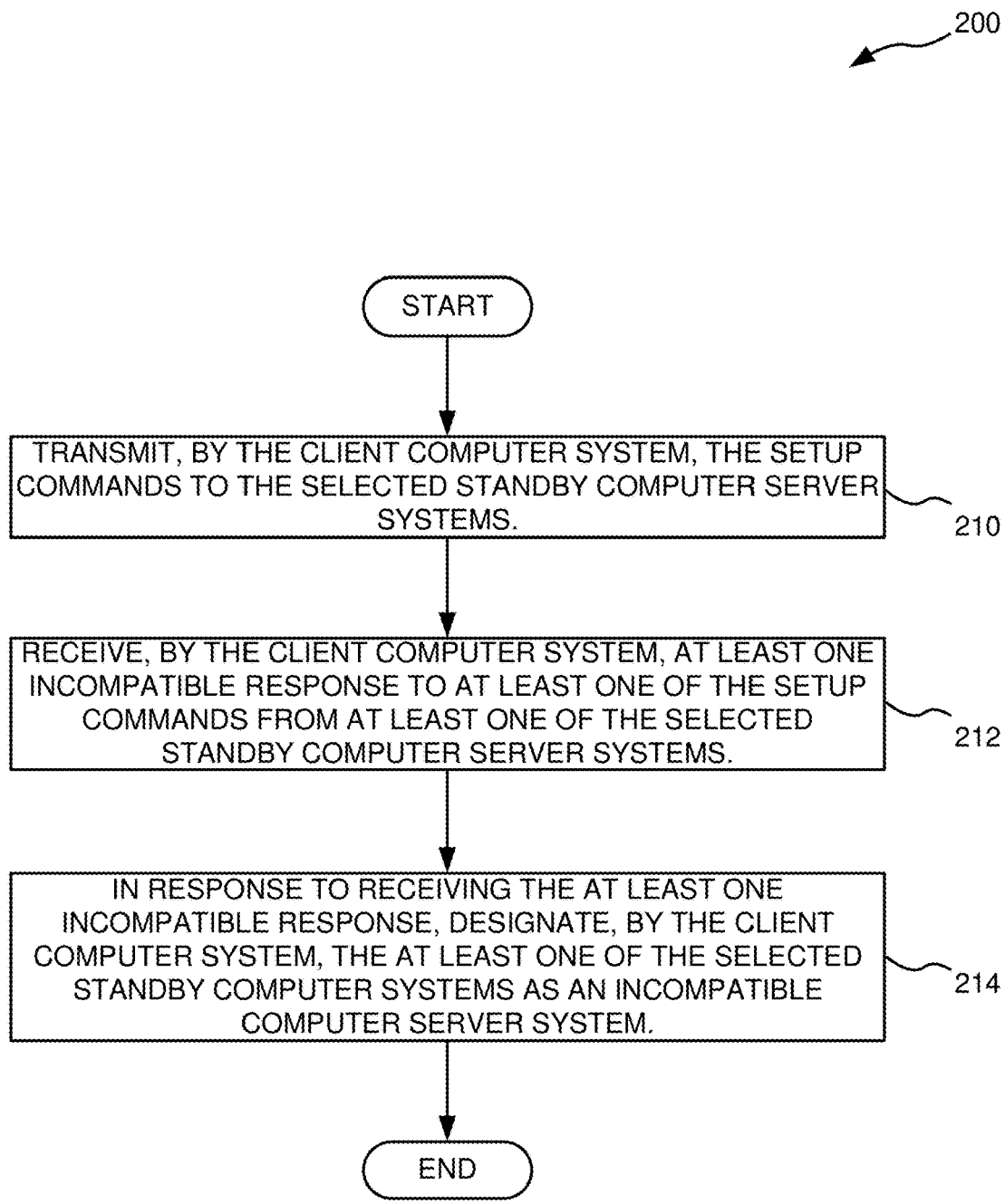
FIG. 2A depicts a flowchart in accordance with an exemplary embodiment of the present invention.

In an exemplary embodiment, the transmitting includes (a) transmitting, by the client computer system, the setup commands to the selected standby computer server systems, (b) receiving, by the client computer system, at least one incompatible response to at least one of the setup commands from at least one of the selected standby computer server systems, and (c) in response to receiving the at least one incompatible response, designating, by the client computer system, the at least one of the selected standby computer systems as an incompatible computer server system. Referring to FIG. 2A, in an exemplary embodiment, transmitting operation 114 includes an operation 210 of transmitting, by the client computer system, the setup commands to the selected standby computer server systems, an operation 212 of receiving, by the client computer system, at least one incompatible response to at least one of the setup commands from at least one of the selected standby computer server systems, and an operation 214 in response to receiving the at least one incompatible response, designating, by the client computer system, the at least one of the selected standby computer systems as an incompatible computer server system.

In an embodiment, the client computer system is a computer system 600 as shown in FIG. 6, that executes a switching servers script or computer software application that carries out the operations of at least method 200. In an embodiment, the client computer system is a computer system/server 612 as shown in FIG. 6, that executes a switching servers script or computer software application that carries out the operations of at least method 200. In an embodiment, the client computer system is a processing unit 616 as shown in FIG. 6, that executes a switching servers script or computer software application that carries out the operations of at least method 200. In an embodiment, the client computer system is a vNIC client device that executes a switching servers script or computer software application that carries out the operations of at least method 200. In an embodiment, the client computer system is a computer system 600 as shown in FIG. 6, that executes a switching servers script or computer software application that carries out at least operations 210, 212, and 214. In an embodiment, the client computer system is a computer system/server 612 as shown in FIG. 6, that executes a switching servers script or computer software application that carries out at least operations 210, 212, and 214. In an embodiment, the client computer system is a processing unit 616 as shown in FIG. 6, that executes a switching servers script or computer software application that carries out at least operations 210, 212, and 214. In an embodiment, the client computer system is a vNIC client device that executes a switching servers script or computer software application that carries out at least operations 210, 212, and 214.

In an embodiment, client computer system 140 is configured to transmit the setup commands to selected standby computer server systems 180, 182. In an embodiment, client computer system 140 includes a computer system, such as computer system 600 as shown in FIG. 6, performing operation 210. In an embodiment, client computer system 140 includes a computer system, such as computer system/server 612 as shown in FIG. 6, performing operation 210. In an embodiment, client computer system 140 includes a computer system, such as processing unit 616 as shown in FIG. 6, performing operation 210. In an embodiment, client computer system 140 is a vNIC client device performing operation 210. In an embodiment, client computer system 140 is implemented as computer software executing on a computer system, such as computer system 600 as shown in FIG. 6, such that the computer system performs operation 210. In an embodiment, client computer system 140 is implemented as computer software executing on a computer system, such as computer system/server 612 as shown in FIG. 6, such that the computer system performs operation 210. In an embodiment, client computer system 140 is implemented as computer software executing on a computer system, such as processing unit 616 as shown in FIG. 6 such that the computer system performs operation 210. In an embodiment, client computer system 140 is implemented as computer software executing on a computer system, such as a vNIC client device, such that the computer system performs operation 210. In an embodiment, client computer system 140 transmits the setup commands to selected standby computer server systems 180, 182 as computer software executing on a processor of client computer system 140. In an embodiment, of client computer system 140 transmits the setup commands to selected standby computer server systems 180, 182 as computer software executing on a vNIC client device.

In an embodiment, client computer system 140 is configured to receive at least one incompatible response to at least one of the setup commands from at least one of selected standby computer server systems 180, 182. In an embodiment, client computer system 140 includes a computer system, such as computer system 600 as shown in FIG. 6, performing operation 212. In an embodiment, client computer system 140 includes a computer system, such as computer system/server 612 as shown in FIG. 6, performing operation 212. In an embodiment, client computer system 140 includes a computer system, such as processing unit 616 as shown in FIG. 6, performing operation 212. In an embodiment, client computer system 140 is a vNIC client device performing operation 212. In an embodiment, client computer system 140 is implemented as computer software executing on a computer system, such as computer system 600 as shown in FIG. 6, such that the computer system performs operation 212. In an embodiment, client computer system 140 is implemented as computer software executing on a computer system, such as computer system/server 612 as shown in FIG. 6, such that the computer system performs operation 212. In an embodiment, client computer system 140 is implemented as computer software executing on a computer system, such as processing unit 616 as shown in FIG. 6 such that the computer system performs operation 212. In an embodiment, client computer system 140 is implemented as computer software executing on a computer system, such as a vNIC client device, such that the computer system performs operation 212. In an embodiment, client computer system 140 receives at least one incompatible response to at least one of the setup commands from at least one of selected standby computer server systems 180, 182 as computer software executing on a processor of client computer system 140. In an embodiment, of client computer system 140 receives at least one incompatible response to at least one of the setup commands from at least one of selected standby computer server systems 180, 182 as computer software executing on a vNIC client device.

In an embodiment, client computer system 140 is configured to designate, in response to receiving the at least one incompatible response, the at least one of selected standby computer systems 180, 182 as an incompatible computer server system. In an embodiment, client computer system 140 includes a computer system, such as computer system 600 as shown in FIG. 6, performing operation 214. In an embodiment, client computer system 140 includes a computer system, such as computer system/server 612 as shown in FIG. 6, performing operation 214. In an embodiment, client computer system 140 includes a computer system, such as processing unit 616 as shown in FIG. 6, performing operation 214. In an embodiment, client computer system 140 is a vNIC client device performing operation 214. In an embodiment, client computer system 140 is implemented as computer software executing on a computer system, such as computer system 600 as shown in FIG. 6, such that the computer system performs operation 214. In an embodiment, client computer system 140 is implemented as computer software executing on a computer system, such as computer system/server 612 as shown in FIG. 6, such that the computer system performs operation 214. In an embodiment, client computer system 140 is implemented as computer software executing on a computer system, such as processing unit 616 as shown in FIG. 6 such that the computer system performs operation 214. In an embodiment, client computer system 140 is implemented as computer software executing on a computer system, such as a vNIC client device, such that the computer system performs operation 214. In an embodiment, client computer system 140 designates, in response to receiving the at least one incompatible response, the at least one of selected standby computer systems 180, 182 as an incompatible computer server system as computer software executing on a processor of client computer system 140. In an embodiment, of client computer system 140 designates, in response to receiving the at least one incompatible response, the at least one of selected standby computer systems 180, 182 as an incompatible computer server system as computer software executing on a processor of client computer system 140 as computer software executing on a vNIC client device.

For example, the client (e.g., client computer system 140) could be responsible for "mirroring" all of its commands to the backup servers (e.g., standby computer server systems 180, 182) simultaneously, and for explicitly rejecting servers that give responses that are incompatible with those that have come back from the active server. In a further example, in the event of a switchover, the client (e.g., client computer system 140) would be responsible for selecting a server from the set of compatible "hot backups", notifying that such selected server that it is now active, and resuming traffic.

Redirecting CRQ via Client Computer System

In an embodiment, the redirecting includes redirecting, by the client computer system, the CRQ to the one of the selected standby computer server systems, resulting in the one of the selected standby computer server systems being designated as the new active computer server system. In an embodiment, redirecting operation 122 includes redirecting, by the client computer system, the CRQ to the one of the selected standby computer server systems, resulting in the one of the selected standby computer server systems being designated as the new active computer server system. In an embodiment, client computer system 140 is configured to redirecting CRQ 142 to the one of the selected standby computer server systems, resulting in the one of the selected standby computer server systems being designated as new active computer server system 184. In an embodiment, client computer system 140 includes a computer system, such as computer system 600 as shown in FIG. 6, redirecting CRQ 142 to the one of the selected standby computer server systems, resulting in the one of the selected standby computer server systems being designated as new active computer server system 184.

In an embodiment, client computer system 140 includes a computer system, such as computer system/server 612 as shown in FIG. 6, redirecting CRQ 142 to the one of the selected standby computer server systems, resulting in the one of the selected standby computer server systems being designated as new active computer server system 184. In an embodiment, client computer system 140 includes a computer system, such as processing unit 616 as shown in FIG. 6, redirecting CRQ 142 to the one of the selected standby computer server systems, resulting in the one of the selected standby computer server systems being designated as new active computer server system 184. In an embodiment, client computer system 140 is a vNIC client device redirecting CRQ 142 to the one of the selected standby computer server systems, resulting in the one of the selected standby computer server systems being designated as new active computer server system 184.

In an embodiment, client computer system 140 is implemented as computer software executing on a computer system, such as computer system 600 as shown in FIG. 6, such that the computer system redirects CRQ 142 to the one of the selected standby computer server systems, resulting in the one of the selected standby computer server systems being designated as new active computer server system 184. In an embodiment, client computer system 140 is implemented as computer software executing on a computer system, such as computer system/server 612 as shown in FIG. 6, such that the computer system redirects CRQ 142 to the one of the selected standby computer server systems, resulting in the one of the selected standby computer server systems being designated as new active computer server system 184. In an embodiment, client computer system 140 is implemented as computer software executing on a computer system, such as processing unit 616 as shown in FIG. 6, such that the computer system redirects CRQ 142 to the one of the selected standby computer server systems, resulting in the one of the selected standby computer server systems being designated as new active computer server system 184. In an embodiment, client computer system 140 is implemented as computer software executing on a computer system, such as a vNIC client device, such that the computer system redirects CRQ 142 to the one of the selected standby computer server systems, resulting in the one of the selected standby computer server systems being designated as new active computer server system 184. In an embodiment, client computer system 140 redirects CRQ 142 to the one of the selected standby computer server systems, resulting in the one of the selected standby computer server systems being designated as new active computer server system 184, as computer software executing on a processor of client computer system 140. In an embodiment, client computer system 140 redirects CRQ 142 to the one of the selected standby computer server systems, resulting in the one of the selected standby computer server systems being designated as new active computer server system 184, as computer software executing on a vNIC client device.

Sending New Setup Commands via Client Computer System

In an embodiment, the sending includes sending, by the client computer system, the new setup commands to the new computer server system. In an embodiment, sending operation 126 includes sending, by the client computer system, the new setup commands to the new computer server system. In an embodiment, client computer system 140 is configured to send the new setup commands to new computer server system 190. In an embodiment, client computer system 140 includes a computer system, such as computer system 600 as shown in FIG. 6, sending the new setup commands to new computer server system 190. In an embodiment, client computer system 140 includes a computer system, such as computer system/server 612 as shown in FIG. 6, sending the new setup commands to new computer server system 190. In an embodiment, client computer system 140 includes a computer system, such as processing unit 616 as shown in FIG. 6, sending the new setup commands to new computer server system 190. In an embodiment, client computer system 140 is a vNIC client device sending the new setup commands to new computer server system 190.

In an embodiment, client computer system 140 is implemented as computer software executing on a computer system, such as computer system 600 as shown in FIG. 6, such that the computer system sends the new setup commands to new computer server system 190. In an embodiment, client computer system 140 is implemented as computer software executing on a computer system, such as computer system/server 612 as shown in FIG. 6, such that the computer system sends the new setup commands to new computer server system 190. In an embodiment, client computer system 140 is implemented as computer software executing on a computer system, such as processing unit 616 as shown in FIG. 6, such that the computer system sends the new setup commands to new computer server system 190. In an embodiment, client computer system 140 is implemented as computer software executing on a computer system, such as a vNIC client device, such that the computer system sends the new setup commands to new computer server system 190. In an embodiment, client computer system 140 sends the new setup commands to new computer server system 190, as computer software executing on a processor of client computer system 140. In an embodiment, client computer system 140 sends the new setup commands to new computer server system 190, as computer software executing on a vNIC client device. For example, as servers come online, the client (e.g., client computer system 140) is responsible for attempting to negotiate its current capabilities and state with each server (e.g., standby computer server systems 180, 182), and rejecting any server that does not conform to that state.

Designating Incompatible Computer Server Systems

Figure 2B:
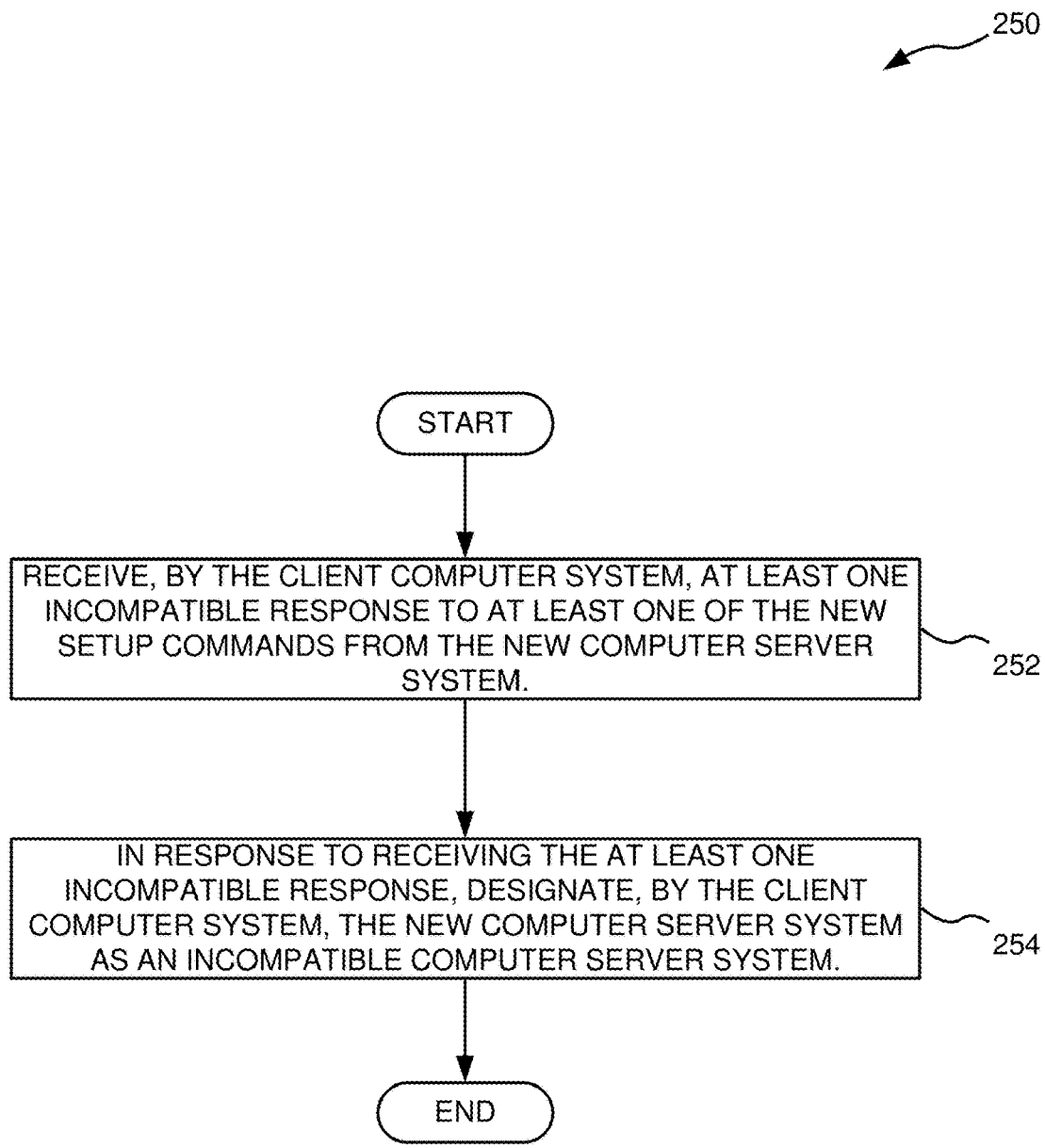
FIG. 2B depicts a flowchart in accordance with an exemplary embodiment of the present invention.

In an exemplary embodiment, the sending further includes (a) receiving, by the client computer system, at least one incompatible response to at least one of the new setup commands from the new computer server system, and (b) in response to receiving the at least one incompatible response, designating, by the client computer system, the new computer server system as an incompatible computer server system. Referring to FIG. 2B, in a further embodiment, sending operation 126 includes an operation 252 of receiving, by the client computer system, at least one incompatible response to at least one of the new setup commands from the new computer server system, and an operation 254 of in response to receiving the at least one incompatible response, designating, by the client computer system, the new computer server system as an incompatible computer server system.

In an embodiment, the client computer system is a computer system 600 as shown in FIG. 6, that executes a switching servers script or computer software application that carries out the operations of at least method 250. In an embodiment, the client computer system is a computer system/server 612 as shown in FIG. 6, that executes a switching servers script or computer software application that carries out the operations of at least method 250. In an embodiment, the client computer system is a processing unit 616 as shown in FIG. 6, that executes a switching servers script or computer software application that carries out the operations of at least method 250. In an embodiment, the client computer system is a vNIC client device that executes a switching servers script or computer software application that carries out the operations of at least method 250. In an embodiment, the client computer system is a computer system 600 as shown in FIG. 6, that executes a switching servers script or computer software application that carries out at least operations 252 and 254. In an embodiment, the client computer system is a computer system/server 612 as shown in FIG. 6, that executes a switching servers script or computer software application that carries out at least operations 252 and 254. In an embodiment, the client computer system is a processing unit 616 as shown in FIG. 6, that executes a switching servers script or computer software application that carries out at least operations 252 and 254. In an embodiment, the client computer system is a vNIC client device that executes a switching servers script or computer software application that carries out at least operations 252 and 254.

In an embodiment, client computer system 140 is configured to receive at least one incompatible response to at least one of the setup commands from new computer server system 190. In an embodiment, client computer system 140 includes a computer system, such as computer system 600 as shown in FIG. 6, performing operation 252. In an embodiment, client computer system 140 includes a computer system, such as computer system/server 612 as shown in FIG. 6, performing operation 252. In an embodiment, client computer system 140 includes a computer system, such as processing unit 616 as shown in FIG. 6, performing operation 252. In an embodiment, client computer system 140 is a vNIC client device performing operation 252. In an embodiment, client computer system 140 is implemented as computer software executing on a computer system, such as computer system 600 as shown in FIG. 6, such that the computer system performs operation 252. In an embodiment, client computer system 140 is implemented as computer software executing on a computer system, such as computer system/server 612 as shown in FIG. 6, such that the computer system performs operation 252. In an embodiment, client computer system 140 is implemented as computer software executing on a computer system, such as processing unit 616 as shown in FIG. 6 such that the computer system performs operation 252. In an embodiment, client computer system 140 is implemented as computer software executing on a computer system, such as a vNIC client device, such that the computer system performs operation 252. In an embodiment, client computer system 140 receives at least one incompatible response to at least one of the new setup commands from new computer server system 190 as computer software executing on a processor of client computer system 140. In an embodiment, client computer system 140 receives at least one incompatible response to at least one of the new setup commands from new computer server system 190 as computer software executing on a vNIC client device.

In an embodiment, client computer system 140 is configured to designate, in response to receiving the at least one incompatible response, new computer server system 190 as an incompatible computer server system. In an embodiment, client computer system 140 includes a computer system, such as computer system 600 as shown in FIG. 6, performing operation 254. In an embodiment, client computer system 140 includes a computer system, such as computer system/server 612 as shown in FIG. 6, performing operation 254. In an embodiment, client computer system 140 includes a computer system, such as processing unit 616 as shown in FIG. 6, performing operation 254. In an embodiment, client computer system 140 is a vNIC client device performing operation 254. In an embodiment, client computer system 140 is implemented as computer software executing on a computer system, such as computer system 600 as shown in FIG. 6, such that the computer system performs operation 254. In an embodiment, client computer system 140 is implemented as computer software executing on a computer system, such as computer system/server 612 as shown in FIG. 6, such that the computer system performs operation 254. In an embodiment, client computer system 140 is implemented as computer software executing on a computer system, such as processing unit 616 as shown in FIG. 6 such that the computer system performs operation 254. In an embodiment, client computer system 140 is implemented as computer software executing on a computer system, such as a vNIC client device, such that the computer system performs operation 254. In an embodiment, client computer system 140 designates, in response to receiving the at least one incompatible response, new computer server system 190 as an incompatible computer server system as computer software executing on a processor of client computer system

140. In an embodiment, client computer system 140 designates, in response to receiving the at least one incompatible response, new computer server system 190 as an incompatible computer server system as computer software executing on a vNIC client device.

Transmitting Setup Commands via Computer Software Firmware

Figure 3A:
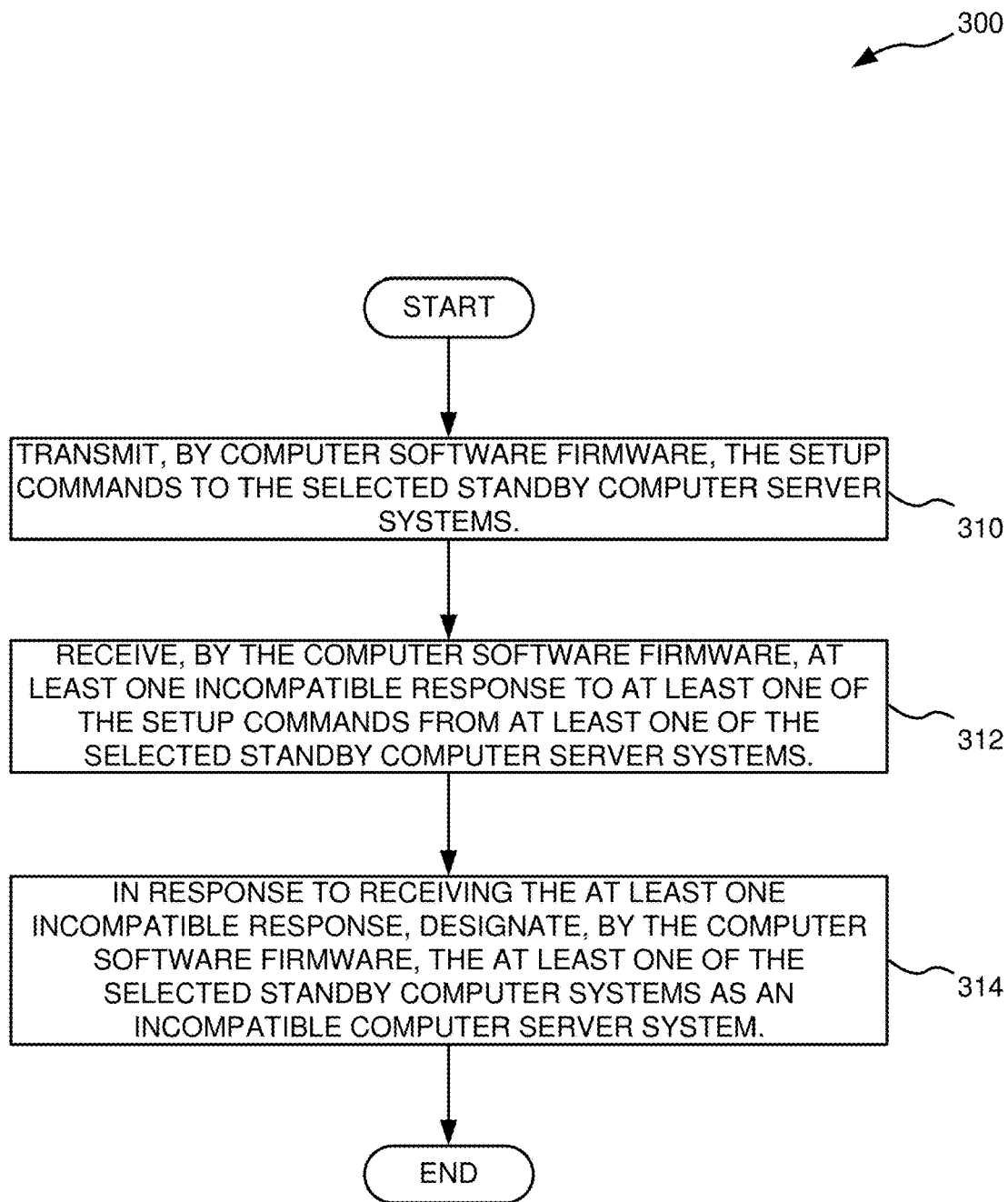
FIG. 3A depicts a flowchart in accordance with an exemplary embodiment of the present invention.

In an exemplary embodiment, the transmitting includes (a) transmitting, by computer software firmware, the setup commands to the selected standby computer server systems, (b) receiving, by the computer software firmware, at least one incompatible response to at least one of the setup commands from at least one of the selected standby computer server systems, and (c) in response to receiving the at least one incompatible response, designating, by the computer software firmware, the at least one of the selected standby computer systems as an incompatible computer server system. Referring to FIG. 3A, in an exemplary embodiment, transmitting operation 114 includes an operation 310 of transmitting, by computer software firmware, the setup commands to the selected standby computer server systems, an operation 312 of receiving, by the computer software firmware, at least one incompatible response to at least one of the setup commands from at least one of the selected standby computer server systems, and an operation 314 in response to receiving the at least one incompatible response, designating, by the computer software firmware, the at least one of the selected standby computer systems as an incompatible computer server system. In an embodiment, the computer software firmware executes a switching servers script or computer software application that carries out the operations of at least method 300. In an embodiment, the computer software firmware executes a switching servers script or computer software application that carries out at least operations 310, 312, and 314.

In an embodiment, the computer software firmware is configured to transmit the setup commands to selected standby computer server systems 180, 182. In an embodiment, the computer software firmware performs operation 310. In an embodiment, the computer software firmware executes on a computer system, such as computer system 600 as shown in FIG. 6, such that the computer system performs operation 310. In an embodiment, the computer software firmware executes on a computer system, such as computer system/server 612 as shown in FIG. 6, such that the computer system performs operation 310. In an embodiment, the computer software firmware executes on a computer system, such as processing unit 616 as shown in FIG. 6 such that the computer system performs operation 310. In an embodiment, the computer software firmware executes on a computer system, such as a vNIC client device, such that the computer system performs operation 310. In an embodiment, the computer software firmware transmits the setup commands to selected standby computer server systems 180, 182 as computer software executing on a processor of client computer system 140. In an embodiment, the computer software firmware transmits the setup commands to selected standby computer server systems 180, 182 as computer software executing on a vNIC client device.

In an embodiment, the computer software firmware is configured to receive at least one incompatible response to at least one of the setup commands from at least one of selected standby computer server systems 180, 182. In an embodiment, the computer software firmware performs operation 312. In an embodiment, the computer software firmware executes on a computer system, such as computer system/server 612 as shown in FIG. 6, such that the computer system performs operation 312. In an embodiment, the computer software firmware executes on a computer system, such as processing unit 616 as shown in FIG. 6 such that the computer system performs operation 312. In an embodiment, the computer software firmware executes on a computer system, such as a vNIC client device, such that the computer system performs operation 312. In an embodiment, the computer software firmware receives at least one incompatible response to at least one of the setup commands from at least one of selected standby computer server systems 180, 182 as computer software executing on a processor of client computer system 140. In an embodiment, the computer software firmware receives at least one incompatible response to at least one of the setup commands from at least one of selected standby computer server systems 180, 182 as computer software executing on a vNIC client device.

In an embodiment, the computer software firmware is configured to designate, in response to receiving the at least one incompatible response, the at least one of selected standby computer systems 180, 182 as an incompatible computer server system. In an embodiment, the computer software firmware performs operation 314. In an embodiment, the computer software firmware executes on a computer system, such as computer system 600 as shown in FIG. 6, such that the computer system performs operation 314. In an embodiment, the computer software firmware executes on a computer system, such as computer system/server 612 as shown in FIG. 6, such that the computer system performs operation 314. In an embodiment, the computer software firmware executes on a computer system, such as processing unit 616 as shown in FIG. 6 such that the computer system performs operation 314. In an embodiment, the computer software firmware executes on a computer system, such as a vNIC client device, such that the computer system performs operation 314. In an embodiment, the computer software firmware designates, in response to receiving the at least one incompatible response, the at least one of selected standby computer systems 180, 182 as an incompatible computer server system as computer software executing on a processor of client computer system 140. In an embodiment, the computer software firmware designates, in response to receiving the at least one incompatible response, the at least one of selected standby computer systems 180, 182 as an incompatible computer server system as computer software executing on a processor of client computer system 140 as computer software executing on a vNIC client device. For example, firmware could manage the "hot backup" set and "mirrors" commands across all active servers. In a further example, if a switchover were to occur, the firmware would select a hot backup and then would notify both server and client that traffic could resume. In a particular embodiment, the computer software firmware is a hypervisor.

Redirecting CRQ via Computer Software Firmware

In an embodiment, the redirecting includes redirecting, by the computer software firmware, the CRQ to the one of the selected standby computer server systems, resulting in the one of the selected standby computer server systems being designated as the new active computer server system. In an embodiment, redirecting operation 122 includes redirecting, by the computer software firmware, the CRQ to the one of the selected standby computer server systems, resulting in the one of the selected standby computer server systems being designated as the new active computer server system. In an embodiment, the computer software firmware is configured to redirect CRQ 142 to the one of the selected standby computer server systems, resulting in the one of the selected standby computer server systems being designated as new active computer server system 184. In an embodiment, the computer software firmware redirects CRQ 142 to the one of the selected standby computer server systems, resulting in the one of the selected standby computer server systems being designated as new active computer server system 184.

In an embodiment, the computer software firmware executes on a computer system, such as computer system 600 as shown in FIG. 6, such that the computer system redirects CRQ 142 to the one of the selected standby computer server systems, resulting in the one of the selected standby computer server systems being designated as new active computer server system 184. In an embodiment, the computer software firmware executes on a computer system, such as computer system/server 612 as shown in FIG. 6, such that the computer system redirects CRQ 142 to the one of the selected standby computer server systems, resulting in the one of the selected standby computer server systems being designated as new active computer server system 184. In an embodiment, the computer software firmware executes on a computer system, such as processing unit 616 as shown in FIG. 6, such that the computer system redirects CRQ 142 to the one of the selected standby computer server systems, resulting in the one of the selected standby computer server systems being designated as new active computer server system 184. In an embodiment, the computer software firmware executes on a computer system, such as a vNIC client device, such that the computer system redirects CRQ 142 to the one of the selected standby computer server systems, resulting in the one of the selected standby computer server systems being designated as new active computer server system 184. In an embodiment, the computer software firmware redirects CRQ 142 to the one of the selected standby computer server systems, resulting in the one of the selected standby computer server systems being designated as new active computer server system 184, as computer software executing on a processor of client computer system 140. In an embodiment, the computer software firmware redirects CRQ 142 to the one of the selected standby computer server systems, resulting in the one of the selected standby computer server systems being designated as new active computer server system 184, as computer software executing on a vNIC client device.

Sending Setup Commands via Computer Software Firmware

In an embodiment, the sending includes sending, by the computer software firmware, the new setup commands to the new computer server system. In an embodiment, sending operation 126 includes sending, by the computer software firmware, the new setup commands to the new computer server system. In an embodiment, the computer software firmware is configured to send the new setup commands to new computer server system 190. In an embodiment, the computer software firmware sends the new setup commands to new computer server system 190.

In an embodiment, the computer software firmware executes on a computer system, such as computer system 600 as shown in FIG. 6, such that the computer system sends the new setup commands to new computer server system 190. In an embodiment, the computer software firmware executes on a computer system, such as computer system/server 612 as shown in FIG. 6, such that the computer system sends the new setup commands to new computer server system 190. In an embodiment, the computer software firmware executes on a computer system, such as processing unit 616 as shown in FIG. 6, such that the computer system sends the new setup commands to new computer server system 190. In an embodiment, the computer software firmware executes on a computer system, such as a vNIC client device, such that the computer system sends the new setup commands to new computer server system 190.

In an embodiment, the computer software firmware sends the new setup commands to new computer server system 190, as computer software executing on a processor of client computer system 140. In an embodiment, the computer software firmware sends the new setup commands to new computer server system 190, as computer software executing on a vNIC client device. For example, if a new server (e.g., a new computer server system) were to come online, the firmware (e.g., computer software firmware) would be responsible for "replaying" the setup negotiation to the new server, and removing it from the hot backup set if responses from the new server do not conform to the current state.

Designating Incompatible Computer Server Systems

Figure 3B:
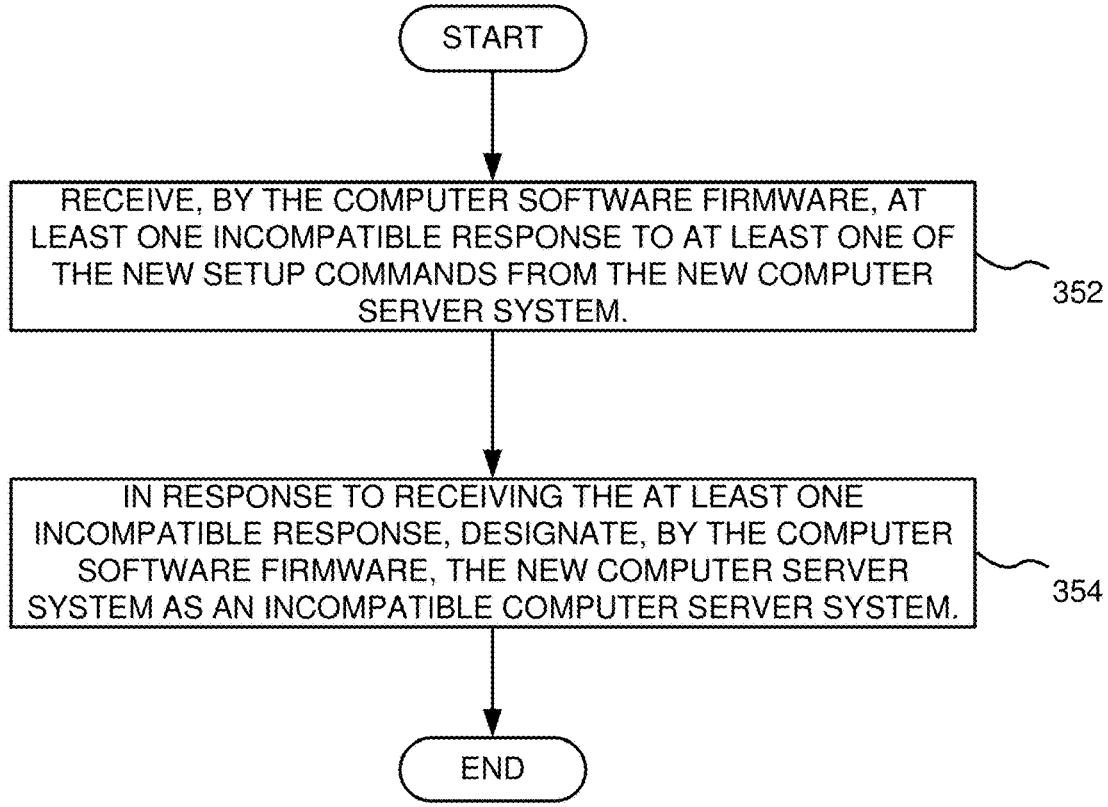
FIG. 3B depicts a flowchart in accordance with an exemplary embodiment of the present invention.

In an exemplary embodiment, the sending further includes (a) receiving, by the computer software firmware, at least one incompatible response to at least one of the new setup commands from the new computer server system, and (b) in response to receiving the at least one incompatible response, designating, by the computer software firmware, the new computer server system as an incompatible computer server system. Referring to FIG. 3B, in a further embodiment, sending operation 126 includes an operation 352 of receiving, by the computer software firmware, at least one incompatible response to at least one of the new setup commands from the new computer server system, and an operation 354 of in response to receiving the at least one incompatible response, designating, by the computer software firmware, the new computer server system as an incompatible computer server system. In an embodiment, the computer software firmware executes a switching servers script or computer software application that carries out the operations of at least method 350. In an embodiment, the computer software firmware executes a switching servers script or computer software application that carries out at least operations 352 and 354.

In an embodiment, the computer software firmware is configured to receive at least one incompatible response to at least one of the new setup commands from new computer server system 190. In an embodiment, the computer software firmware performs operation 352. In an embodiment, the computer software firmware executes on a computer system, such as computer system 600 as shown in FIG. 6, such that the computer system performs operation 352. In an embodiment, the computer software firmware executes on a computer system, such as computer system/server 612 as shown in FIG. 6, such that the computer system performs operation 352. In an embodiment, the computer software firmware executes on a computer system, such as processing unit 616 as shown in FIG. 6 such that the computer system performs operation 352. In an embodiment, the computer software firmware executes on a computer system, such as a vNIC client device, such that the computer system performs operation 352. In an embodiment, the computer software firmware receives at least one incompatible response to at least one of the new setup commands from new computer server system 190 as computer software executing on a processor of client computer system 140. In an embodiment, the computer software firmware receives at least one incompatible response to at least one of the new setup commands from new computer server system 190 as computer software executing on a vNIC client device.

In an embodiment, the computer software firmware is configured to designate, in response to receiving the at least one incompatible response, new computer server system 190 as an incompatible computer server system. In an embodiment, the computer software firmware performs operation 354. In an embodiment, the computer software firmware executes on a computer system, such as computer system 600 as shown in FIG. 6, such that the computer system performs operation 354. In an embodiment, the computer software firmware executes on a computer system, such as computer system/server 612 as shown in FIG. 6, such that the computer system performs operation 354. In an embodiment, the computer software firmware executes on a computer system, such as processing unit 616 as shown in FIG. 6 such that the computer system performs operation 354. In an embodiment, the computer software firmware executes on a computer system, such as a vNIC client device, such that the computer system performs operation 354. In an embodiment, the computer software firmware designates, in response to receiving the at least one incompatible response, new computer server system 190 as an incompatible computer server system as computer software executing on a processor of client computer system 140. In an embodiment, the computer software firmware designates, in response to receiving the at least one incompatible response, new computer server system 190 as an incompatible computer server system as computer software executing on a vNIC client device.

Transmitting Setup Commands by Storing History

In a particular embodiment, the transmitting the setup commands includes storing, by the computer software firmware, a history of commands and responses communicated between the client computer system and the previous active computer server system. In an embodiment, transmitting operation 310 includes storing, by the computer software firmware, a history of commands and responses communicated between the client computer system and the previous active computer server system. In an embodiment, the computer software firmware is configured to store a history of commands and responses communicated between client computer system 140 and previous active computer server system 170. In an embodiment, the computer software firmware stores a history of commands and responses communicated between client computer system 140 and previous active computer server system 170.

In an embodiment, the computer software firmware executes on a computer system, such as computer system 600 as shown in FIG. 6, such that the computer system stores a history of commands and responses communicated between client computer system 140 and previous active computer server system 170. In an embodiment, the computer software firmware executes on a computer system, such as computer system/server 612 as shown in FIG. 6, such that the computer system stores a history of commands and responses communicated between client computer system 140 and a previous active computer server system 170. In an embodiment, the computer software firmware executes on a computer system, such as processing unit 616 as shown in FIG. 6, such that the computer system stores a history of commands and responses communicated between client computer system 140 and previous active computer server system 170. In an embodiment, the computer software firmware executes on a computer system, such as a vNIC client device, such that the computer system stores a history of commands and responses communicated between client computer system 140 and previous active computer server system 170. In an embodiment, the computer software firmware stores a history of commands and responses communicated between client computer system 140 and previous active computer server system 170 as computer software executing on a processor of client computer system 140. In an embodiment, the computer software firmware stores a history of commands and responses communicated between client computer system 140 and previous active computer server system 170 as computer software executing on a vNIC client device. For example, the computer software firmware could record the command/response history of the active connection. In a further example, the hot-backup servers (e.g., selected standby computer server systems 180, 182) could need to maintain a small amount of state that is not kept live (e.g., programming the active MAC address in a hot backup could potentially disrupt the function of the active server).

Transmitting Setup Commands by Maintaining State

In a particular embodiment, the transmitting the setup commands includes maintaining, by the computer software firmware, a logically coherent state corresponding to semantics of commands and responses communicated between the client computer system and the previous active computer server system. In an embodiment, transmitting operation 310 includes maintaining, by the computer software firmware, a logically coherent state corresponding to semantics of commands and responses communicated between the client computer system and the previous active computer server system. In an embodiment, the computer software firmware is configured to maintain a logically coherent state corresponding to semantics of commands and responses communicated between client computer system 140 and previous active computer server system 170. In an embodiment, the computer software firmware maintains a logically coherent state corresponding to semantics of commands and responses communicated between client computer system 140 and previous active computer server system 170.

In an embodiment, the computer software firmware executes on a computer system, such as computer system 600 as shown in FIG. 6, such that the computer system maintains a logically coherent state corresponding to semantics of commands and responses communicated between client computer system 140 and previous active computer server system 170. In an embodiment, the computer software firmware executes on a computer system, such as computer system/server 612 as shown in FIG. 6, such that the computer system maintains a logically coherent state corresponding to semantics of commands and responses communicated between client computer system 140 and previous active computer server system 170. In an embodiment, the computer software firmware executes on a computer system, such as processing unit 616 as shown in FIG. 6, such that the computer system maintains a logically coherent state corresponding to semantics of commands and responses communicated between client computer system 140 and previous active computer server system 170. In an embodiment, the computer software firmware executes on a computer system, such as a vNIC client device, such that the computer system maintains a logically coherent state corresponding to semantics of commands and responses communicated between client computer system 140 and previous active computer server system 170.

In an embodiment, the computer software firmware maintains a logically coherent state corresponding to semantics of commands and responses communicated between client computer system 140 and previous active computer server system 170 as computer software executing on a processor of client computer system 140. In an embodiment, the computer software firmware maintains a logically coherent state corresponding to semantics of commands and responses communicated between client computer system 140 and previous active computer server system 170 as computer software executing on a vNIC client device. For example, the computer software firmware could maintain a logically-coherent state corresponding to the semantics of those commands and responses. In a further example, the hot-backup servers (e.g., selected standby computer server systems 180, 182) could need to maintain a small amount of state that is not kept live (e.g., programming the active MAC address in a hot backup could potentially disrupt the function of the active server).

Example

Figure 4:
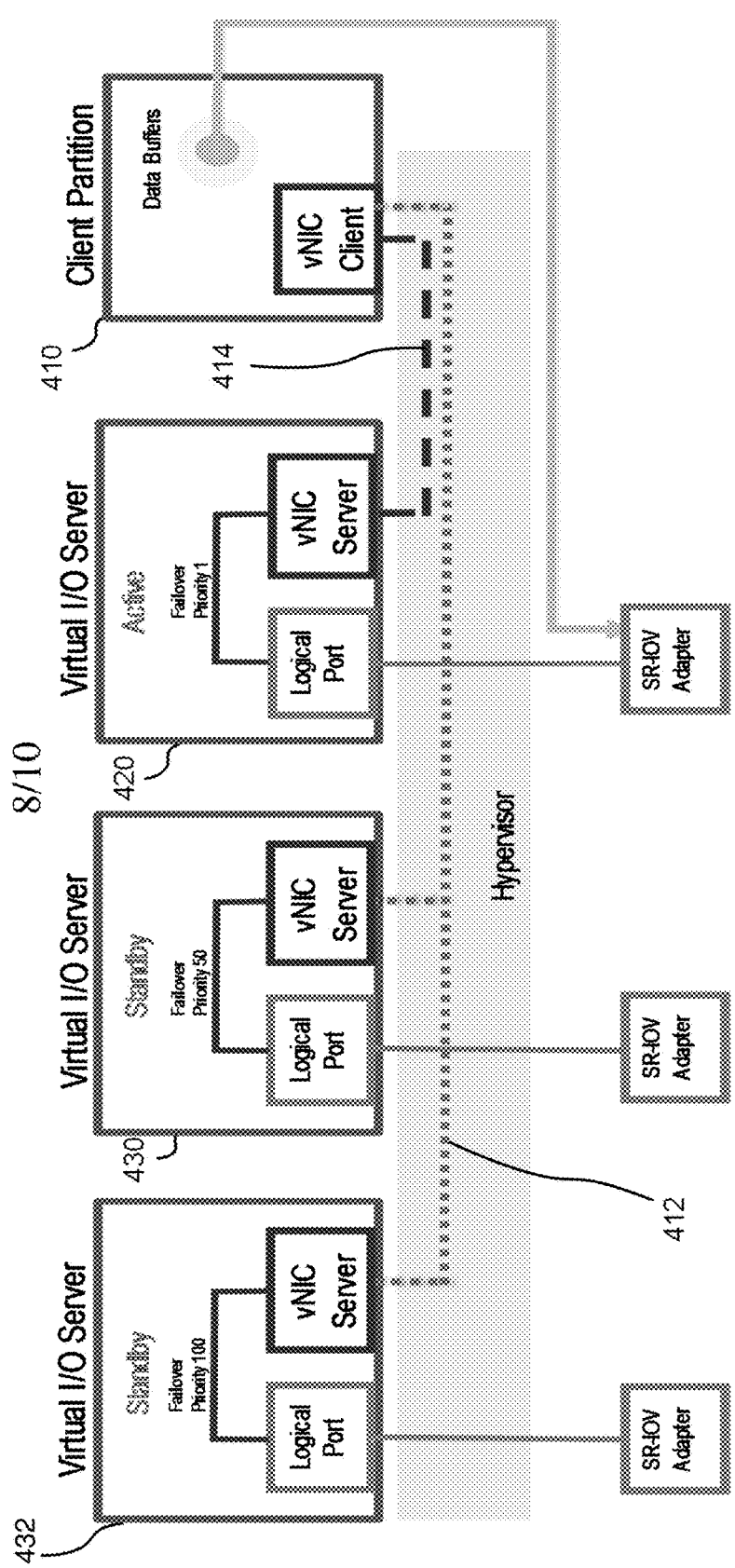
FIG. 4 depicts a block diagram in accordance with an embodiment of the present invention.

FIG. 4 depicts an example of the present invention with client computer system 140 implemented as a client partition 410, that includes a vNIC client and data buffers. As shown in FIG. 4, the vNIC client in client partition 410 drives configuration to an active backing device 420 (a virtual input/output (I/O) server) (an example of previous active computer server system 170, new active computer server system 184) via a logical connection 414 (an example of sub-CRQ 144). Also, as shown in FIG. 4, the vNIC client in client partition 410 drives configuration to hot standby backing devices 430, 432 (virtual I/O servers) (examples of standby computer servers 180, 182) via a logical connection 412 (an example of CRQ 142). In this example, the client (e.g., client partition 410) independently manages connections to multiple vNIC servers as if each one was connected to a "main CRQ".

Figure 5:
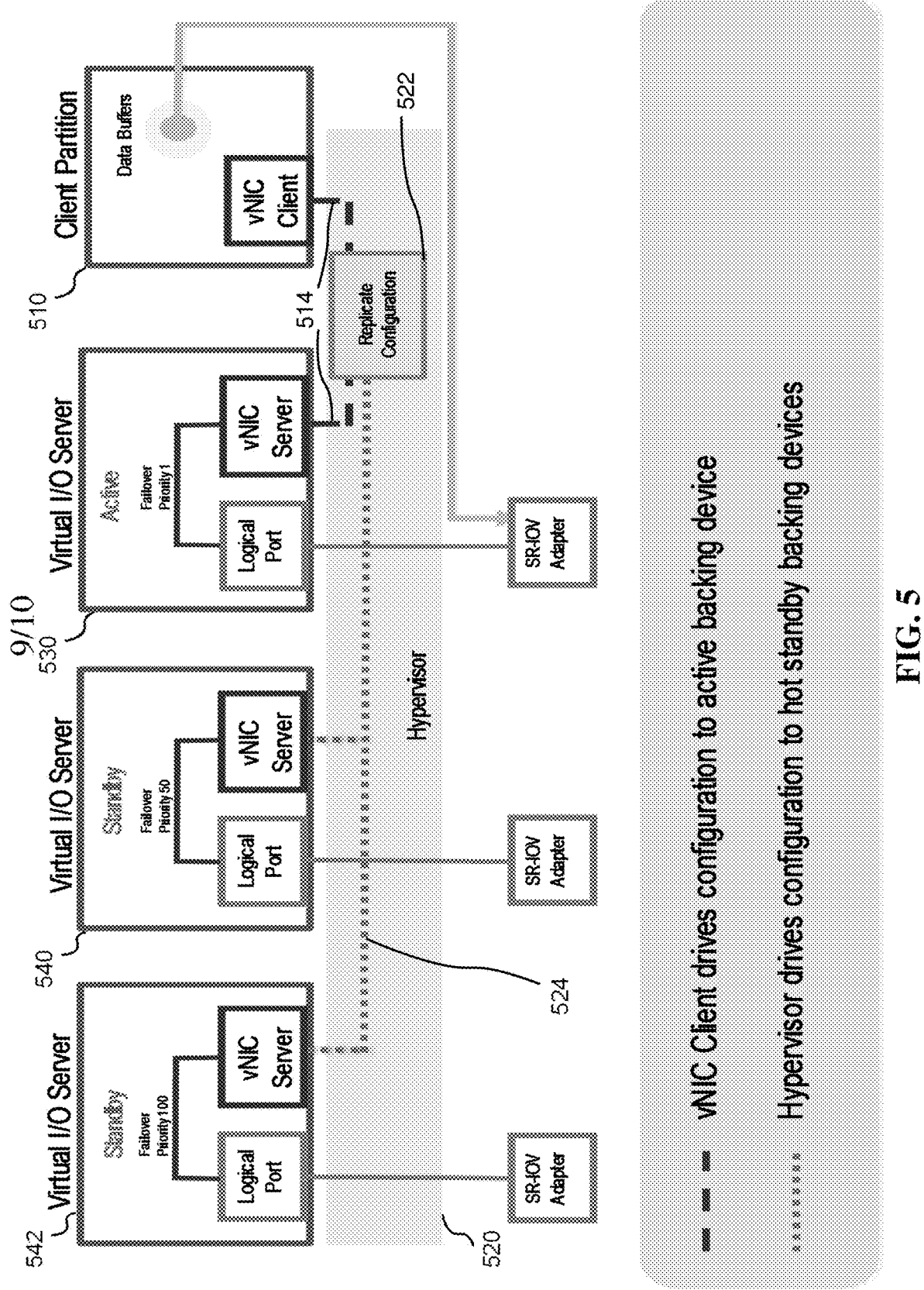
FIG. 5 depicts a block diagram in accordance with an embodiment of the present invention.

FIG. 5 depicts an example of the present invention with client computer system 140 implemented as a client partition 510, that includes a vNIC client and data buffers, and the computer software firmware implemented as a hypervisor 520, that includes replicate configuration firmware 522. As shown in FIG. 5, the vNIC client in client partition 510 drives configuration to an active backing device 530 (a virtual input/output (I/O) server) (an example of previous active computer server system 170, new active computer server system 184) via a logical connection 514 (an example of sub-CRQ 144) and hypervisor 520 via replicate configuration firmware 522. Also, as shown in FIG. 5, hypervisor 520, specifically replicate configuration firmware 522, drives configuration to hot standby backing devices 540, 542 (virtual I/O servers) (examples of standby computer servers 180, 182) via a logical connection 524 (an example of CRQ 142) and hypervisor 520 via replicate configuration firmware 522. In this example, the firmware is responsible for ensuring that the client's setup commands are mirrored to all available vNIC servers.

Computer System

In an exemplary embodiment, the host computer system is a computer system 600 as shown in FIG. 6. Computer system 600 is only one example of a computer system and is not intended to suggest any limitation as to the scope of use or functionality of embodiments of the present invention. Regardless, computer system 600 is capable of being implemented to perform and/or performing any of the functionality/operations of the present invention.

Computer system 600 includes a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 612 may be described in the general context of computer system-executable instructions, such as program modules, being executed by a computer system. Generally, program modules may include routines, programs, objects, components, logic, and/or data structures that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computer system 600 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions/operations of embodiments of the invention.

Program/utility 640, having a set (at least one) of program modules 642, may be stored in memory 628 by way of example, and not limitation. Exemplary program modules 642 may include an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the present invention.

Computer system/server 612 may also communicate with one or more external devices 614 such as a keyboard, a pointing device, a display 624, one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
   selecting, by a client computer system, standby computer server systems logically coupled to the client computer system, wherein the selected standby computer server systems are compatible with the client computer system and wherein the client computer system is logically coupled to a command-response queue (CRQ);
   in response to determining by the client computer system that at least one of the selected standby computer server systems is ready, connecting, by the client computer system, the CRQ to a previous active computer server system and to the selected standby computer server systems;
   in response to the connecting, transmitting setup commands to the selected standby computer server systems, resulting in at least one of the selected standby computer server systems having the same logical state as the previous active computer server system;
   communicating, by the client computer system, data of the previous active computer server system via at least one sub-CRQ logically coupling the client computer system and the previous active computer server system;
   in response to the transmitting, communicating, by the client computer system, management commands of the previous active computer server system to the selected standby computer server systems via the CRQ;
   in response to communicating management commands, redirecting the CRQ to one of the selected standby computer server systems, resulting in the one of the selected standby computer server systems being designated as a new active computer server system;
   in response to the redirecting, communicating, by the client computer system, data with the new active computer server system via at least one sub-CRQ logically coupling the client computer system and the new active computer server system; and
   in response to receiving by the client computer system a request from a new computer server system to become a new standby computer server system, sending new setup commands to the new computer server system, resulting in the new computer server system having the same logical state as an active computer server system and being designated as the new standby computer server system.

2. The method of claim 1 wherein receiving, by the client computer system, a notification that the switchover has occurred via the CRQ.

3. The method of claim 1 wherein the transmitting comprises:
   transmitting, by the client computer system, the setup commands to the selected standby computer server systems;
   receiving, by the client computer system, at least one incompatible response to at least one of the setup commands from at least one of the selected standby computer server systems; and
   in response to receiving the at least one incompatible response, designating, by the client computer system, the at least one of the selected standby computer systems as an incompatible computer server system.

4. The method of claim 3 wherein the redirecting comprises redirecting, by the client computer system, the CRQ to the one of the selected standby computer server systems, resulting in the one of the selected standby computer server systems being designated as the new active computer server system.

5. The method of claim 3 wherein the sending comprises sending, by the client computer system, the new setup commands to the new computer server system.

6. The method of claim 5 further comprising:
   receiving, by the client computer system, at least one incompatible response to at least one of the new setup commands from the new computer server system; and
   in response to receiving the at least one incompatible response, designating, by the client computer system, the new computer server system as an incompatible computer server system.

7. The method of claim 1 wherein the transmitting comprises:
   transmitting, by computer software firmware, the setup commands to the selected standby computer server systems;
   receiving, by the computer software firmware, at least one incompatible response to at least one of the setup commands from at least one of the selected standby computer server systems; and
   in response to receiving the at least one incompatible response, designating, by the computer software firmware, the at least one of the selected standby computer systems as an incompatible computer server system.

8. The method of claim 7 wherein the redirecting comprises redirecting, by the computer software firmware, the CRQ to the one of the selected standby computer server systems, resulting in the one of the selected standby computer server systems being designated as the new active computer server system.

9. The method of claim 7 wherein the sending comprises transmitting, by the computer software firmware, the new setup commands to the new computer server system.

10. The method of claim 9 further comprising:
receiving, by the computer software firmware, at least one incompatible response to at least one of the new setup commands from the new computer server system; and
in response to receiving the at least one incompatible response, designating, by the computer software firmware, the new computer server system as an incompatible computer server system.

11. The method of claim 7 wherein the transmitting the setup commands comprises storing, by the computer software firmware, a history of commands and responses communicated between the client computer system and the previous active computer server system.

12. The method of claim 7 wherein the transmitting the setup commands comprises maintaining, by the computer software firmware, a logically coherent state corresponding to semantics of commands and responses communicated between the client computer system and the previous active computer server system.

13. A system comprising:
a client computer system
to select standby computer server systems logically coupled to the client computer system, wherein the selected standby computer server systems are compatible with the client computer system and wherein the client computer system is logically coupled to a command- response queue (CRQ),
to connect, in response to determining by the client computer system that at least one of the selected standby computer server systems is ready, the CRQ to a previous active computer server system and to the selected standby computer server systems,
to communicate data of the previous active computer server system via at least one sub-CRQ logically coupling the client computer system and the previous active computer server system,
to communicate, in response to transmission of setup commands to the selected standby computer server systems, management commands of the previous active computer server system to the selected standby computer server systems via the CRQ, and
to communicate, in response to redirection of the CRQ to a new active computer server system, data with the new active computer server system via at least one sub- CRQ logically coupling the client computer system and the new active computer server system, and;
a transmitter
to transmit, in response to connecting by the client computer system the CRQ to the previous active computer system and to the selected standby computer server systems, the setup commands to the selected standby computer server systems, resulting in the selected standby computer server systems having the same logical state as the previous active computer server system, and
to send, in response to receiving a request from a new computer server system to become a new standby computer server system, new setup commands to the new computer server system, resulting in the new computer server system having the same logical state as an active computer server system and being designated as the new standby computer server system; and
a redirector to redirect, in response to a switchover from the previous active computer server system to the selected standby computer server systems, the CRQ to one of the selected standby computer server systems, resulting in the one of the selected standby computer server systems being designated as the new active computer server system.

14. The system of claim 13 wherein the client computer system receives a notification that the switchover has occurred via the CRQ.

15. The system of claim 13 wherein to transmit,
the client computer system transmits the setup commands to the selected standby computer server systems,
the client computer system receives at least one incompatible response to at least one of the setup commands from at least one of the selected standby computer server systems, and
the client computer system, in response to receiving the at least one incompatible response, designates the at least one of the selected standby computer systems as an incompatible computer server system.

16. The system of claim 15 wherein to redirect, the client computer system redirects the CRQ to the one of the selected standby computer server systems, resulting in the one of the selected standby computer server systems being designated as the new active computer server system.

17. The system of claim 13 wherein to transmit,
a computer software firmware transmits the setup commands to the selected standby computer server systems,
the computer software firmware receives at least one incompatible response to at least one of the setup commands from at least one of the selected standby computer server systems, and
the computer software firmware, in response to receiving the at least one incompatible response, designates the at least one of the selected standby computer systems as an incompatible computer server system.

18. The system of claim 17 wherein to redirect, the computer software firmware redirects the CRQ to the one of the selected standby computer server systems, resulting in the one of the selected standby computer server systems being designated as the new active computer server system.

19. The system of claim 17 wherein to transmit, the computer software firmware stores a history of commands and responses communicated between the client computer system and the previous active computer server system.

20. A computer program product comprising a non-transitory computer readable storage medium having program instructions embodied therewith, the program instructions executable by a processor to cause the processor to perform a method comprising:
selecting standby computer server systems logically coupled to a client computer system, wherein the selected standby computer server systems are compatible with the client computer system and wherein the client computer system is logically coupled to a command-response queue (CRQ);
in response to determining that at least one of the selected standby computer server systems is ready, connecting the CRQ to a previous active computer server system and to the selected standby computer server systems;
in response to the connecting, transmitting setup commands to the selected standby computer server systems, resulting in at least one of the selected standby computer server systems having the same logical state as the previous active computer server system;
communicating data of the previous active computer server system via at least one sub- CRQ logically coupling the client computer system and the previous active computer server system;

in response to the transmitting, communicating management commands of the previous active computer server system to the selected standby computer server systems via the CRQ;

in response to a switchover from the previous active computer server system to the selected standby computer server systems, redirecting the CRQ to one of the selected standby computer server systems, resulting in the one of the selected standby computer server systems being designated as a new active computer server system;

in response to the redirecting, communicating, by the client computer system, data with the new active computer server system via at least one sub-CRQ logically coupling the client computer system and the new active computer server system; and in response to receiving by the client computer system a request from a new computer server system to become a new standby computer server system, sending new setup commands to the new computer server system, resulting in the new computer server system having the same logical state as an active computer server system and being designated as the new standby computer server system.

* * * * *